US012810679B1

(12) United States Patent
Ye

(10) Patent No.: US 12,810,679 B1
(45) Date of Patent: *Nov. 24, 2026

(54) FRUIT AND VEGETABLE SMOOTHIE AUTOMATIC VENDING MACHINE

(71) Applicant: Huaqin Ye, Dongguan (CN)

(72) Inventor: Huaqin Ye, Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/322,268

(22) Filed: Sep. 8, 2025

(51) Int. Cl.

| | |
|---|---|
| ***G07F 15/00*** | (2006.01) |
| ***A47J 43/044*** | (2006.01) |
| ***A47J 43/07*** | (2006.01) |
| ***A47J 44/00*** | (2006.01) |
| ***A47J 47/01*** | (2006.01) |

(52) U.S. Cl.

CPC ............ *G07F 15/00* (2013.01); *A47J 43/044* (2013.01); *A47J 43/0711* (2013.01); *A47J 44/00* (2013.01); *A47J 47/01* (2013.01)

(58) Field of Classification Search

CPC ....... G07F 13/065; A23G 9/045; A23G 9/224; A23G 9/30

USPC ....................................................... 222/129.1

See application file for complete search history.

(56) References Cited

U.S. PATENT DOCUMENTS

| | | | | |
|---|---|---|---|---|
| 12,488,650 B1 * | 12/2025 | Ye | A23G 9/224 | |
| 2009/0179042 A1 * | 7/2009 | Milan | G07F 9/105 | 62/235.1 |
| 2013/0277394 A1 * | 10/2013 | Edwards | B67D 1/0891 | 222/144.5 |
| 2014/0151402 A1 * | 6/2014 | Jannatkhah | A47F 9/00 | 222/399 |
| 2017/0039797 A1 * | 2/2017 | Elmery | G07F 17/0071 | |
| 2021/0225117 A1 * | 7/2021 | Levine | G07F 17/0064 | |

FOREIGN PATENT DOCUMENTS

WO WO-2024057062 A1 * 3/2024 ........... G06Q 10/063

* cited by examiner

*Primary Examiner* — Paul R Durand
*Assistant Examiner* — Michael J. Melaragno

(57) ABSTRACT

The present invention discloses a fruit and vegetable smoothie automatic vending machine, comprising a housing, a vending unit, and a beverage preparation mechanism; the vending unit is arranged inside the housing; the beverage preparation mechanism is arranged on one side of the vending unit inside the housing; the vending unit produces fruit cups and conveys them to the beverage preparation mechanism to be processed into fruit and vegetable smoothie beverages; further comprising a refrigeration system and a control system; the refrigeration system is arranged at the bottom inside the housing and supplies cold air for the equipment; the control system is arranged at the rear inside the housing and is used to control the entire equipment.

12 Claims, 30 Drawing Sheets

FRUIT AND VEGETABLE SMOOTHIE AUTOMATIC VENDING MACHINE

FIELD OF THE APPLICATION

The present invention relates to the technical field of automatic vending machines, and specifically relates to a fruit and vegetable smoothie automatic vending machine.

BACKGROUND

A smoothie machine, also known as a smoothie maker, is employed in the production of beverages containing smoothies. Existing automated smoothie machines can, after setting a program, achieve automatic washing and conveying of fruits, automatic peeling, coring, and juicing, automatic addition and crushing of ice to prepare smoothies, custom mixing of smoothie salads, automatic cup filling and movement to a specific self-service pickup location, and automatic order storage, among other functions.

However, traditional fruit smoothie production suffers from problems such as low efficiency, high hygiene risks, and significant raw material loss; it cannot achieve on-site processing of various fresh fruits and vegetables, precise proportioning of multiple materials, and customized smoothie production; resulting in monotonous beverage flavor and severe nutrient loss.

Furthermore, equipment cleaning and maintenance are complex, waste collection is inadequate, making it difficult to meet the hygiene and efficiency requirements of commercial scenarios.

Therefore, to solve the aforementioned problems, a fruit and vegetable smoothie automatic vending machine is designed.

SUMMARY

The technical problem to be solved by the present invention is to overcome the above-mentioned technical defects and provide a fruit and vegetable smoothie automatic vending machine.

To solve the above technical problem, the technical solution provided by the present invention is a fruit and vegetable smoothie automatic vending machine, comprising: a housing, a vending unit, and a beverage preparation mechanism; the vending unit is arranged inside the housing; the beverage preparation mechanism is arranged on one side of the vending unit inside the housing; the vending unit produces fruit cups and conveys them to the beverage preparation mechanism to be processed into fruit and vegetable smoothie beverages;

Further comprising a refrigeration system and a control system; the refrigeration system is arranged at a bottom inside the housing and supplies cold air for the equipment; the control system is arranged at a rear inside the housing and is used to control the entire equipment;

The vending unit comprises a fruit particle storage mechanism, a transfer mechanism, and a waste collection mechanism; the fruit particle storage mechanism is arranged at an upper part inside the housing; the waste collection mechanism is arranged at a front part inside the housing; the waste collection mechanism is located below the fruit particle storage mechanism and is used to collect fruit particles falling from the fruit particle storage mechanism.

As an improvement, the beverage preparation mechanism comprises an agitation device, a cup dispenser, a water flushing mechanism, a material feeding mechanism, a cover tube access mechanism, and a self-service checkout machine; a front door is provided at a front end of the housing; an item retrieval opening is provided in a middle portion of the front door; the agitation device is arranged inside the housing and is located behind the item retrieval opening; the water flushing mechanism is arranged directly below the agitation device; a slide rail frame is provided on one side of the agitation device inside the housing; drawer slide rails are provided on both inner side walls of the slide rail frame; the material feeding mechanism is arranged inside the slide rail frame, and both sides thereof are respectively connected to the corresponding drawer slide rails; the cup dispenser is arranged inside the slide rail frame, and both sides thereof are respectively connected to the corresponding drawer slide rails; the cup dispenser is located behind the material feeding mechanism; a cover retrieval opening is provided below the item retrieval opening at an upper end of the front door; a cup tube door mechanism is provided on an inner wall of the front door; the cup tube door mechanism cooperates with the cover retrieval opening and the item retrieval opening to simultaneously close and open the cover retrieval opening and the item retrieval opening; the cover tube access mechanism is provided at a rear end of the cup tube door mechanism inside the housing; the self-service checkout machine is provided on one side of the cover tube access mechanism inside the housing;

An agitation controller is provided above the agitation device inside the housing;

A display screen is provided in an upper middle portion of the front door.

As an improvement, the material feeding mechanism comprises an ingredient bin frame, ingredient bins, a milk container frame, a milk container, and a mixer; one side of the milk container frame is connected to one side of the ingredient bin frame; the connected one side of the milk container frame and the connected one side of the ingredient bin frame are respectively connected to the drawer slide rails; the milk container is placed inside the milk container frame; a plurality of ingredient bins are placed inside the ingredient bin frame; a discharge tube is provided at a lower part of a front end of each of the milk container and the ingredient bins; a feed motor is provided at a rear end of each of the milk container and the ingredient bins; a first conveying screw shaft is provided at a bottom inside each of the milk container and the ingredient bins; a rear end of the first conveying screw shaft is connected to a shaft of the corresponding feed motor; a front end of the first conveying screw shaft is located inside the discharge tube; a spiral blade of the first conveying screw shaft is in tight contact with the discharge tube; a bevel gear meshing with the first conveying screw shaft is rotatably provided inside the milk container; the mixer is provided on the milk container frame below the discharge tube; a lower end of the discharge tube on the milk container extends into an interior of the mixer; a mixing motor is provided at a rear part of a lower end of the mixer; a rotating shaft of the mixing motor extends into the mixer; a discharge channel is provided at a front end of the mixer; a plurality of internally threaded tubes are provided on one side of the mixer on the milk container frame; a quick-connect coupling is provided at a front end of each internally threaded tube.

As an improvement, the water flushing mechanism comprises a base frame, a rotating frame, a drip tray, a perforated drainage plate, and a right-angle motor; the base frame is fixed inside the housing; a drip tray tube is provided on the base frame; the drip tray is provided on an upper end of the drip tray tube; a tapered cylinder is provided inside the drip tray; a bottom of the tapered cylinder communicates with the drip tray tube; a screen plate is provided on an upper end of the tapered cylinder; a flush inlet is provided at a center of the screen plate directly above the drip tray tube; a placement trough is provided on the screen plate surrounding an outer periphery of the flush inlet; the perforated drainage plate is placed on the screen plate and sleeves an exterior of the placement trough; a plurality of protruding anti-slip blocks are provided on a bottom surface of the placement trough; the plurality of anti-slip blocks are circumferentially arranged along an inner wall of the placement trough; the rotating frame is arranged below the drip tray and sleeves an exterior of the drip tray tube; a thrust roller bearing is provided at a lower end of the drip tray; an upper end of the rotating frame is located inside the thrust roller bearing, enabling a rotational connection between the rotating frame and the drip tray; a sleeve tube is provided on the rotating frame surrounding the exterior of the drip tray tube; a driven gear is provided on an exterior of the sleeve tube; the right-angle motor is provided at a lower end of the base frame; a shaft of the right-angle motor extends above the base frame; a drive gear is provided on the shaft of the right-angle motor extending above the base frame; the drive gear meshes with the driven gear to drive the rotating frame to rotate; a semi-annular shield is provided on an upper end of the rotating frame; a notch is provided on one side of the semi-annular shield; a first photoelectric sensor is provided on the drip tray; the first photoelectric sensor cooperates with the notch.

As an improvement, the cup tube door mechanism comprises a first electric linear actuator, a door frame, a door slide rail, a cup cover door, and an anti-pinch photoelectric barrier; the door frame is arranged on the inner wall of the front door and is located outside the cover retrieval opening and the item retrieval opening; door slide rails are provided on both inner side walls of the door frame; connecting members are provided on the outer sides of the door slide rails and are connected to sliders of the door slide rails; the cup cover door is arranged between the two connecting members and is connected to the connecting members; the cup cover door is located at a middle lower part of the connecting members; a glass frame is provided between the two connecting members and is connected to the connecting members; the glass frame is located above the cup cover door; the first electric linear actuator is provided on the inner wall of the front door; an upper end of the first electric linear actuator is connected to the cup cover door;

the anti-pinch photoelectric barriers are provided on both outer side walls of the door frame.

As an improvement, the transfer mechanism comprises a gripper-equipped mechanical arm and an XZ dual-axis linear module; the gripper-equipped mechanical arm is arranged inside the housing and is located laterally below the cup dispenser; the XZ dual-axis linear module is arranged inside the housing and is located between the refrigeration system and the waste collection mechanism; a mounting bracket is provided on a slider of the XZ dual-axis linear module; a scale mounting base is provided on an end of the mounting bracket away from the XZ dual-axis linear module; an electronic scale is provided inside the scale mounting base; a waterproof cover is provided on an upper end of the electronic scale; a second photoelectric sensor is provided on one side of the scale mounting base.

As an improvement, the fruit particle storage mechanism comprises a freezing cabinet, a lower fixed frame, an upper fixed frame, a fruit barrel mechanism, a slide rail mounting bracket, and a second electric linear actuator; slide rail mounting brackets are symmetrically arranged above the refrigeration system inside the housing; a track plate is provided on the inner side wall of each slide rail mounting bracket; two slide grooves are provided on the inner side wall of each track plate; an upwardly inclined arc-shaped groove extends from the front end of each slide groove; a wheel bracket is provided on the inner side of the two track plates; a first roller is provided on the wheel bracket at each position corresponding to the two slide grooves of the track plate; the two first rollers on the wheel bracket are arranged one in front and one behind; two balance wheels are provided on a side of the wheel bracket close to the track plate; the balance wheels roll against the side surface of the corresponding track plate; a gasket strip retainer is provided between the two wheel brackets and is connected to the wheel brackets; a base shell is installed on the gasket strip retainer; a dregs collection box is provided inside the base shell and is connected to the gasket strip retainer; an actuator mounting piece is provided at the rear ends of the two track plates and is connected to the track plates; a second electric linear actuator is provided in the middle of the actuator mounting piece; a front end of the second electric linear actuator is connected to the base shell;

The freezing cabinet is arranged on the slide rail mounting brackets; an inner shell is provided inside the freezing cabinet; a lower fixed frame is provided at the bottom of the inner shell; an upper fixed frame is provided on the upper end of the lower fixed frame; a plurality of fruit barrel mechanisms are uniformly arranged inside the upper fixed frame;

An evaporator is provided at the top inside the inner shell; the evaporator is located behind the fruit barrel mechanisms.

As an improvement, the fruit barrel mechanism comprises a fruit container, a permanent magnet synchronous motor, a discharge guide hopper, a second conveying screw shaft, and a cutter head; the fruit container is arranged on the upper fixed frame; a rear mounting piece is provided at a bottom of a rear end of the fruit container; a bearing housing with a spherical bearing is provided on the rear mounting piece; the second conveying screw shaft is arranged at a bottom inside the fruit container; a rear end of the second conveying screw shaft is arranged within the bearing housing with the spherical bearing and extends through the bearing housing with the spherical bearing; a motor mount is provided at a rear end of the fruit container on the upper fixed frame; a plurality of permanent magnet synchronous motors are uniformly arranged on the motor mount; the permanent magnet synchronous motors correspond one-to-one with the fruit containers; each permanent magnet synchronous motor is connected to the corresponding second conveying screw shaft via a coupling; a discharge hole is provided at a front end of the fruit container; a support bracket is provided within the discharge hole; a front end of the second conveying screw shaft is rotatably connected to the support bracket; the front end of the second conveying screw shaft extends out of the support bracket; a threaded hole is provided at the front end of the second conveying screw shaft; the cutter head is mounted to the threaded hole via a bolt; a buffer chamber is provided ahead of the discharge hole inside the fruit container; a discharge outlet is provided at a lower end of the buffer chamber; a mounting cylinder is provided directly below the discharge outlet at a front end of the inner shell; the discharge guide hopper is provided inside the mounting cylinder.

As an improvement, the waste collection mechanism comprises a large dregs collection tray, a small dregs collection tray, a guide chute, a receiving plate, and a waste collection bucket; the large dregs collection tray is arranged below the discharge guide hopper; a guide chute is provided on the front inner wall of the housing; the guide chute is located above the large dregs collection tray; a receiving plate is provided on the front inner wall of the housing between the large dregs collection tray and the guide chute; the small dregs collection tray is arranged inside the housing below the material feeding mechanism; the waste collection bucket is arranged below the small dregs collection tray; a drain pipe is provided at a lower end of each of the large dregs collection tray and the small dregs collection tray; the drain pipe communicates with the waste collection bucket via a pipeline.

As an improvement, a plurality of weighing mechanisms are provided below the large dregs collection tray at the bottom inside the housing; water buckets are placed on the weighing mechanisms.

As an improvement, locking casters are provided at four corner positions of a bottom of the housing.

As an improvement, a viewing window is provided at a front end of the housing; the viewing window is located in front of the fruit particle storage mechanism.

As an improvement, maintenance doors are symmetrically provided at a rear end of the housing.

The advantages of the present invention compared to existing technology are as follows:

1. This machine enables order placement via the display screen. The control system then directs the transfer mechanism to retrieve a cup from the cup dispenser, proceed to the fruit particle storage mechanism and the material feeding mechanism for ingredient addition, subsequently transport it to the water flushing mechanism, and control the agitation device to process the materials within the cup into a smoothie beverage. Following this, the cover retrieval opening and item retrieval opening will open, allowing the purchaser to collect the finished smoothie beverage, along with a lid and straw. This completes the entire process of beverage preparation and sale without any manual intervention, achieving full mechanization in the sale and production of fruit and vegetable smoothie beverages, thereby saving human and material resources.
2. The inclusion of a refrigeration system allows for cooling of the inner cabinet to −18 degrees Celsius. Rapid freezing helps preserve fruits and vegetables or other materials, ensures hygiene and safety, guarantees maximum retention of nutrients and flavor, and minimizes product loss.
3. The fruit particle storage mechanism and material feeding mechanism are incorporated. The fruit particle storage mechanism includes multiple fruit containers, enabling the placement of various fruits and vegetables in each container. This allows for the offering of a variety of produce, giving purchasers the option to choose a single type or a mix of multiple fruits and vegetables. The material feeding mechanism also comprises multiple ingredient bins and a milk container, allowing for the placement of various frozen blocks (containing high-quality additives like yogurt and acai berries, and other nutritious ingredients) in the ingredient bins to enhance the smoothie's texture and flavor while providing probiotics and antioxidants. Milk can be placed in the milk container, enabling the preparation of diverse, nutritious, and uniquely flavored smoothie beverages. Customers can select ingredients based on their preferences, enabling customized smoothie beverages. Each material has a dedicated storage location, preventing cross-contamination of flavors and ensuring cleaner and more hygienic conditions.

For larger fruits and vegetables, they can be pre-processed into small pieces or particles before being placed into the fruit containers. Each fruit container is equipped with a second conveying screw shaft, which assists in material discharge, and a cutter head that further breaks down the materials. This effectively improves processing efficiency, enables more precise material dispensing, and avoids waste of raw materials.

4. The gripper-equipped mechanical arm and the XZ dual-axis linear module work in tandem. The gripper-equipped mechanical arm retrieves an empty cup from the cup dispenser and transports it to the waterproof cover on the electronic scale of the XZ dual-axis linear module. The XZ dual-axis linear module then moves the empty cup under the corresponding discharge guide hopper to receive ingredients. Simultaneously, the electronic scale weighs the cup and provides feedback to the control system. Once the total weight of the cup reaches the specified value, the gripper-equipped mechanical arm removes the cup containing fruits/vegetables and transports it under the material feeding mechanism to add the corresponding toppings. It is then delivered to the water flushing mechanism, where the agitation device processes the materials inside the cup into a smoothie beverage. This achieves fully automated processing.
5. Multiple weighing mechanisms are located at the bottom of the housing. Water storage buckets are placed on these weighing mechanisms, allowing the system to determine if the bucket contains water based on weight, providing accurate feedback on water inventory levels.
6. The entire machine structure adopts a modular design, facilitating easier maintenance and repair, as well as simplifying production and manufacturing, thereby reducing costs.
7. The machine incorporates a self-service checkout machine, compatible with installation structures for various payment modules. It can adapt to different payment modules, facilitating convenient user payment.
8. A waste collection mechanism is included, capable of collecting generated wastewater or raw material particles, etc. This keeps the interior of the machine clean and hygienic, and facilitates the centralized disposal of waste, saving time.

BRIEF DESCRIPTION OF THE DRAWINGS

As shown in FIGS. 1-30:

Figure 1:
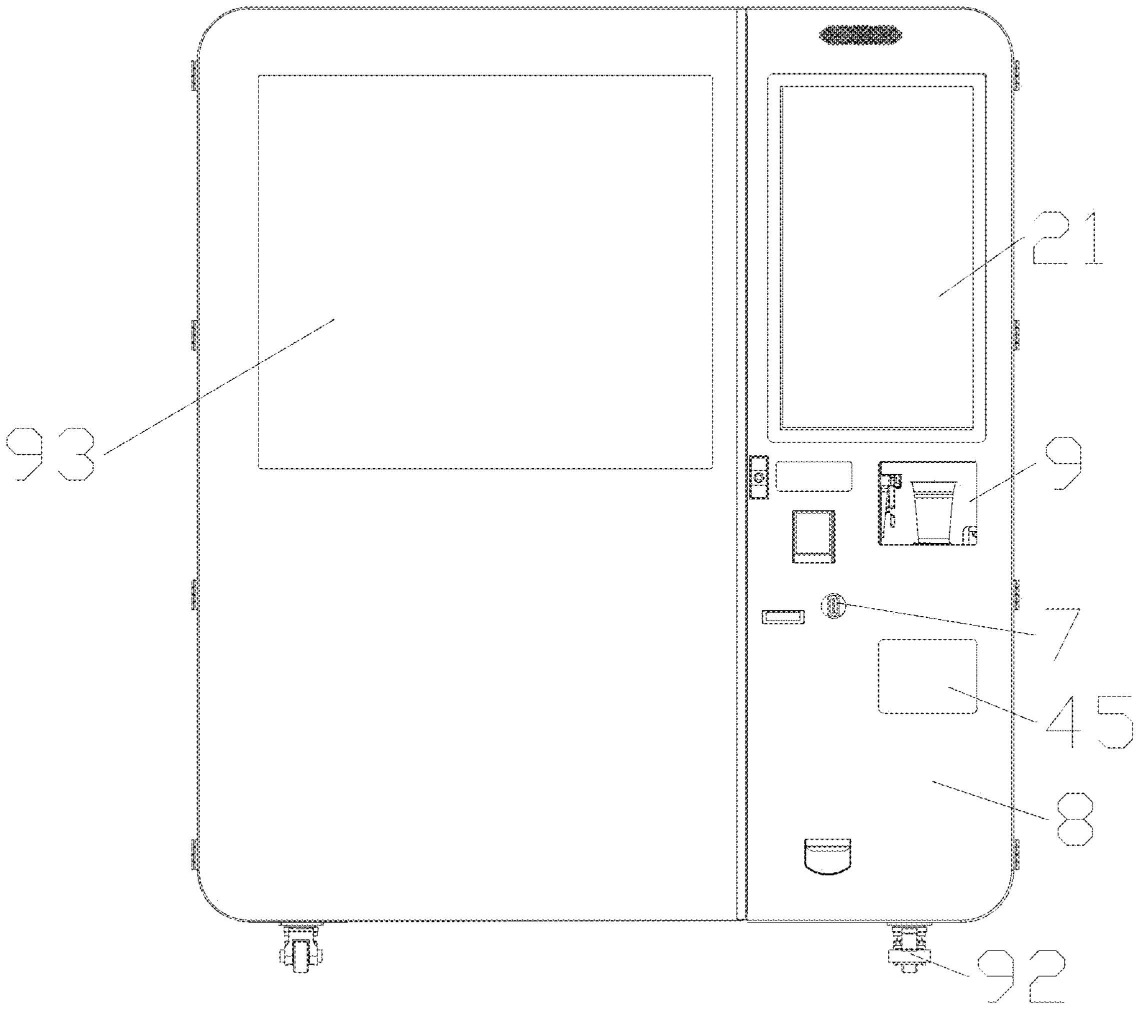
FIG. 1 is a front view of the fruit and vegetable smoothie automatic vending machine according to the present invention.

1. Housing, 2. Refrigeration system, 3. Control system, 4. Agitation device, 4-1. Agitation controller, 5. Cup dispenser, 6. Cover tube access mechanism, 7. Self-service checkout machine, 8. Front door, 9. Item retrieval opening, 10. Slide rail frame, 11. Drawer slide rail, 12. Cover retrieval opening, 13. Ingredient bin frame, 14. Ingredient bin, 15. Milk container frame, 16. Milk container, 17. Mixer, 18. Discharge tube, 19. First conveying screw shaft, 20. Bevel gear, 21. Display screen, 22. Mixing motor, 23. Internally threaded tube, 24. Quick-connect coupling, 25. Base frame, 26. Rotating frame, 27. Drip tray, 28. Perforated drainage plate, 29. Right-angle motor, 30. Drip tray tube, 31. Tapered cylinder, 32. Screen plate, 33. Flush inlet, 34. Placement trough, 35. Anti-slip block, 36. Sleeve tube, 37. Driven gear, 38. Drive gear, 39. Semi-annular shield, 40. Notch, 41. First photoelectric sensor, 42. First electric linear actuator, 43. Door frame, 44. Door slide rail, 45. Cup cover door, 46. Connecting member, 47. Glass frame, 48. Anti-pinch photoelectric barrier, 49. Gripper-equipped mechanical arm, 50. XZ dual-axis linear module, 51. Mounting bracket, 52. Scale mounting base, 53. Electronic scale, 54. Waterproof cover, 55. Second photoelectric sensor, 56. Freezer cabinet, 57. Lower fixed frame, 58. Upper fixed frame, 59. Slide rail mounting bracket, 60. Track plate, 61. Slide groove, 62. Arc-shaped groove, 63. Wheel bracket, 64. First roller, 65. Balance wheel, 66. Gasket strip retainer, 67. Base shell, 68. Residue collection box, 69. Actuator mounting piece, 70. Inner shell, 71. Evaporator, 72. Fruit container, 73. Permanent magnet synchronous motor, 74. Feed guide hopper, 75. Second conveying screw shaft, 76. Cutter head, 77. Rear mounting piece, 78. Bearing housing with spherical bearing, 79. Motor mount, 80. Drainage hole, 81. Support bracket, 82. Buffer chamber, 83. Discharge outlet, 84. Mounting cylinder, 85. Large dregs collection tray, 86. Small dregs collection tray, 87. Guide chute, 88. Receiving plate, 89. Waste collection bucket, 90. Drain pipe, 91. Weighing mechanism, 92. Locking caster, 93. Viewing window, 94. Access door, 95. Viscous liquid container, 96. Peristaltic pump, 97. Second electric linear actuator, 98. Feed motor, 99. Self-priming pump While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The following provides a further detailed description of the fruit and vegetable smoothie automatic vending machine according to the present invention with reference to the accompanying drawings.

Figure 2:
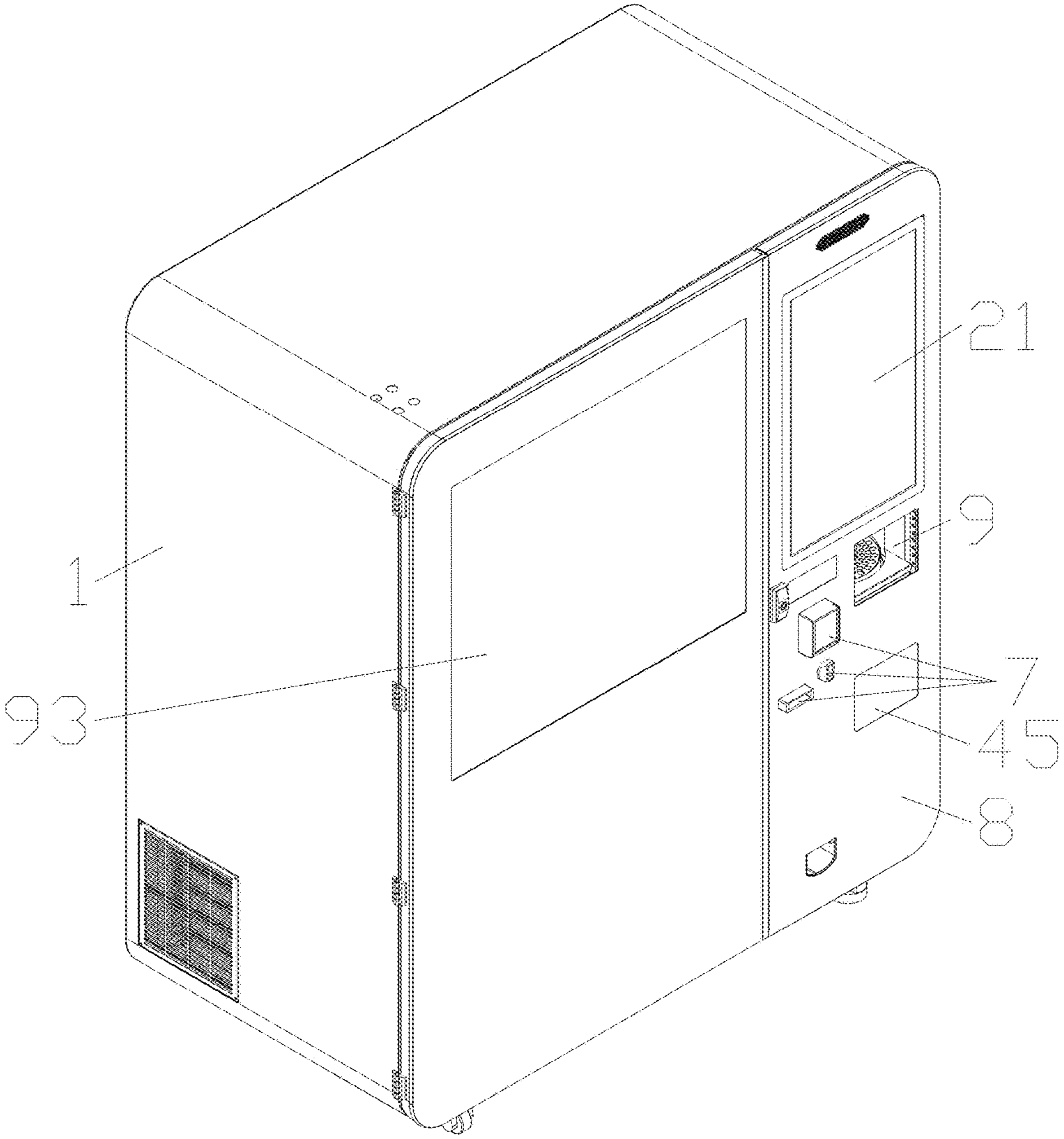
FIG. 2 is a front perspective view of the fruit and vegetable smoothie automatic vending machine according to the present invention.
Figure 3:
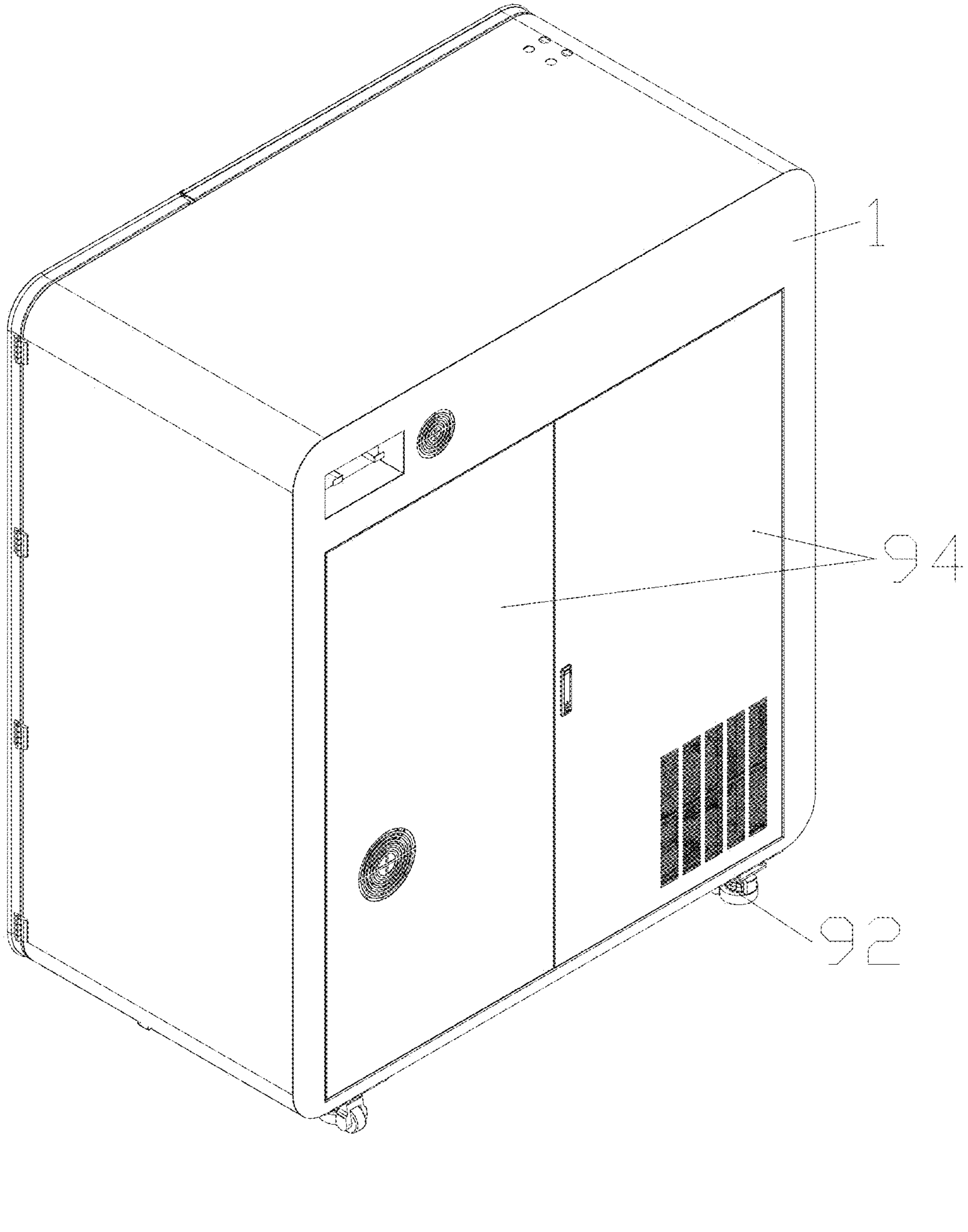
FIG. 3 is a rear perspective view of the fruit and vegetable smoothie automatic vending machine according to the present invention.
Figure 4:
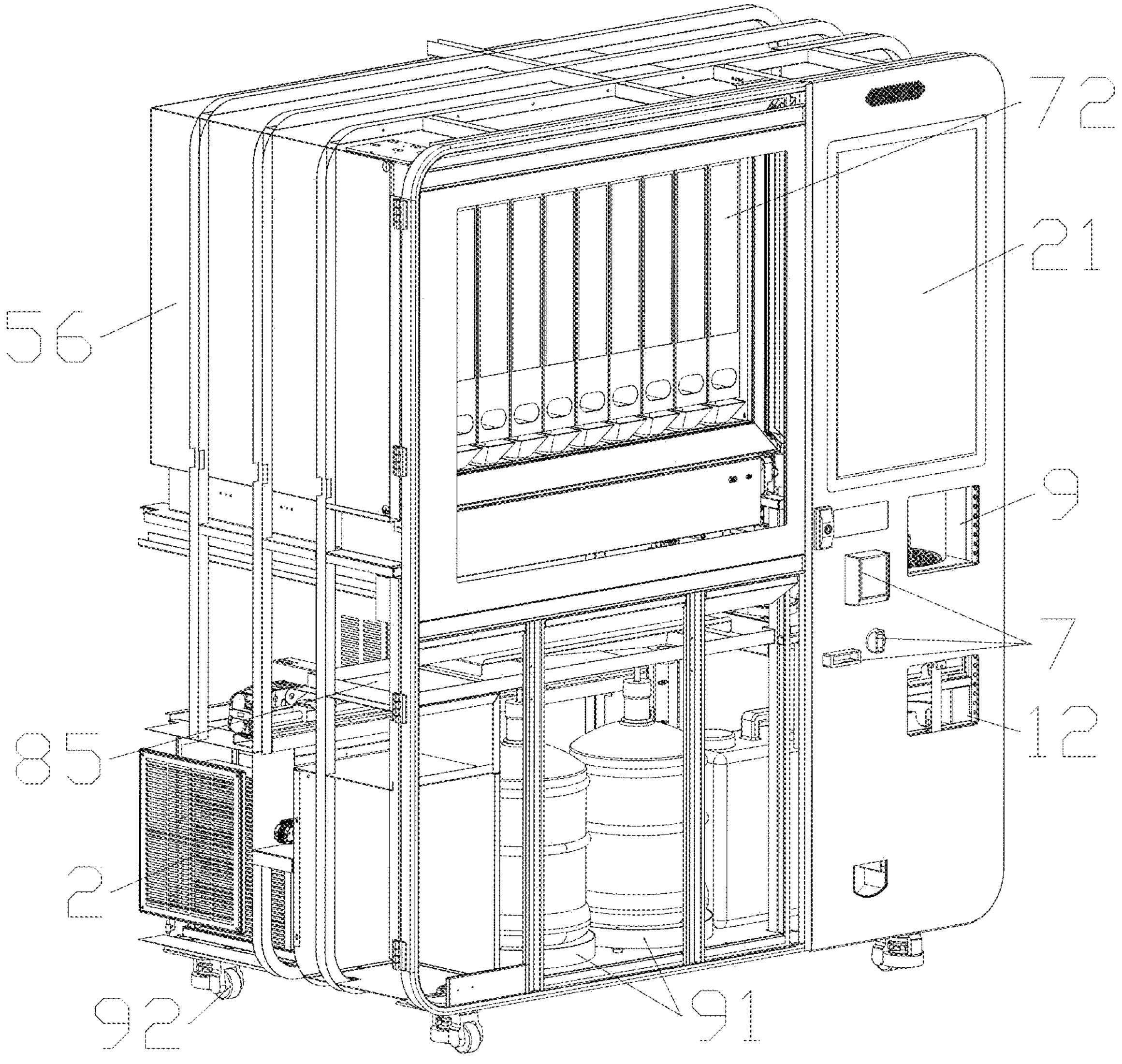
FIG. 4 is a first internal structural view of the fruit and vegetable smoothie automatic vending machine according to the present invention.
Figure 5:
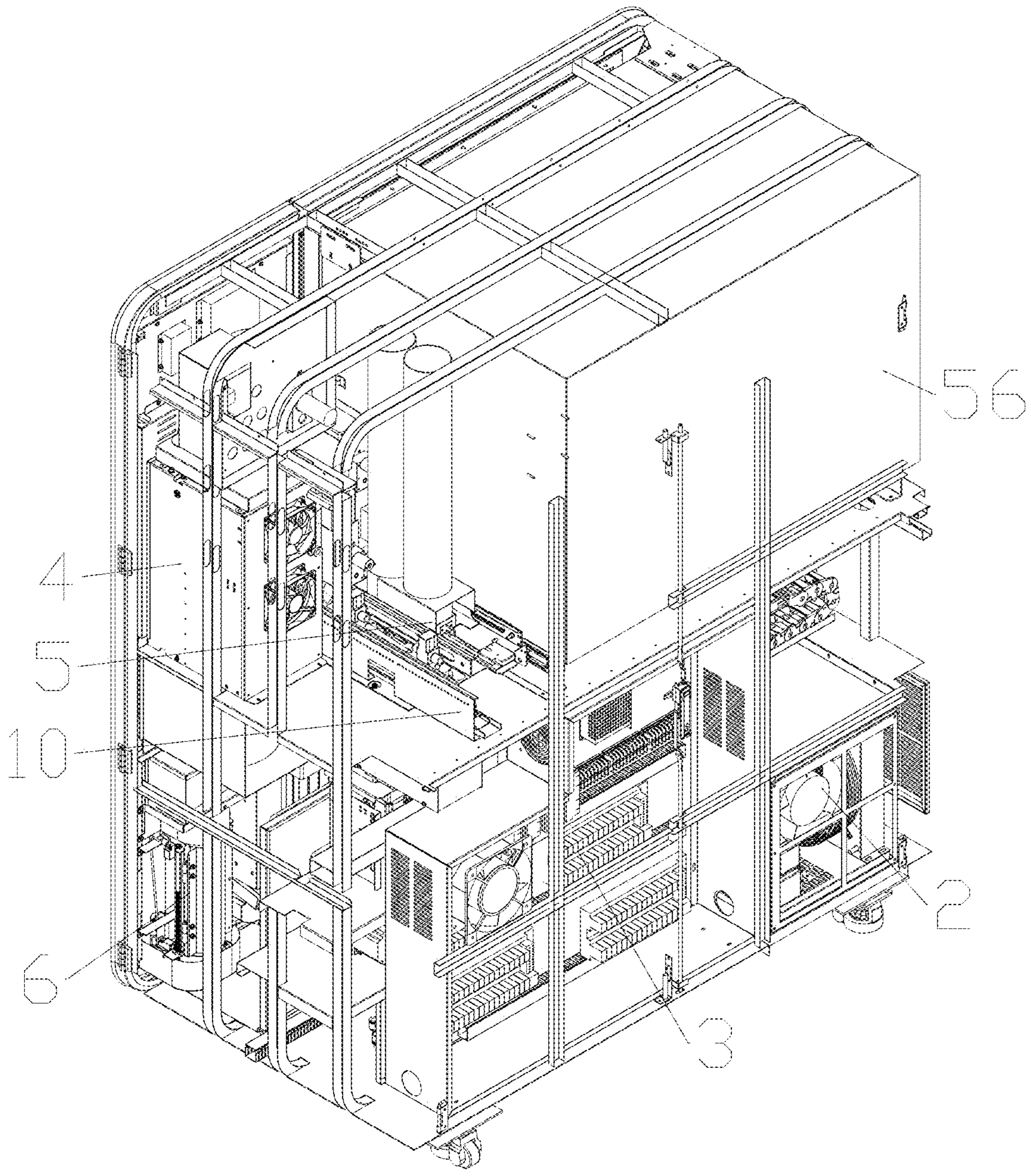
FIG. 5 is a second internal structural view of the fruit and vegetable smoothie automatic vending machine according to the present invention.
Figure 6:
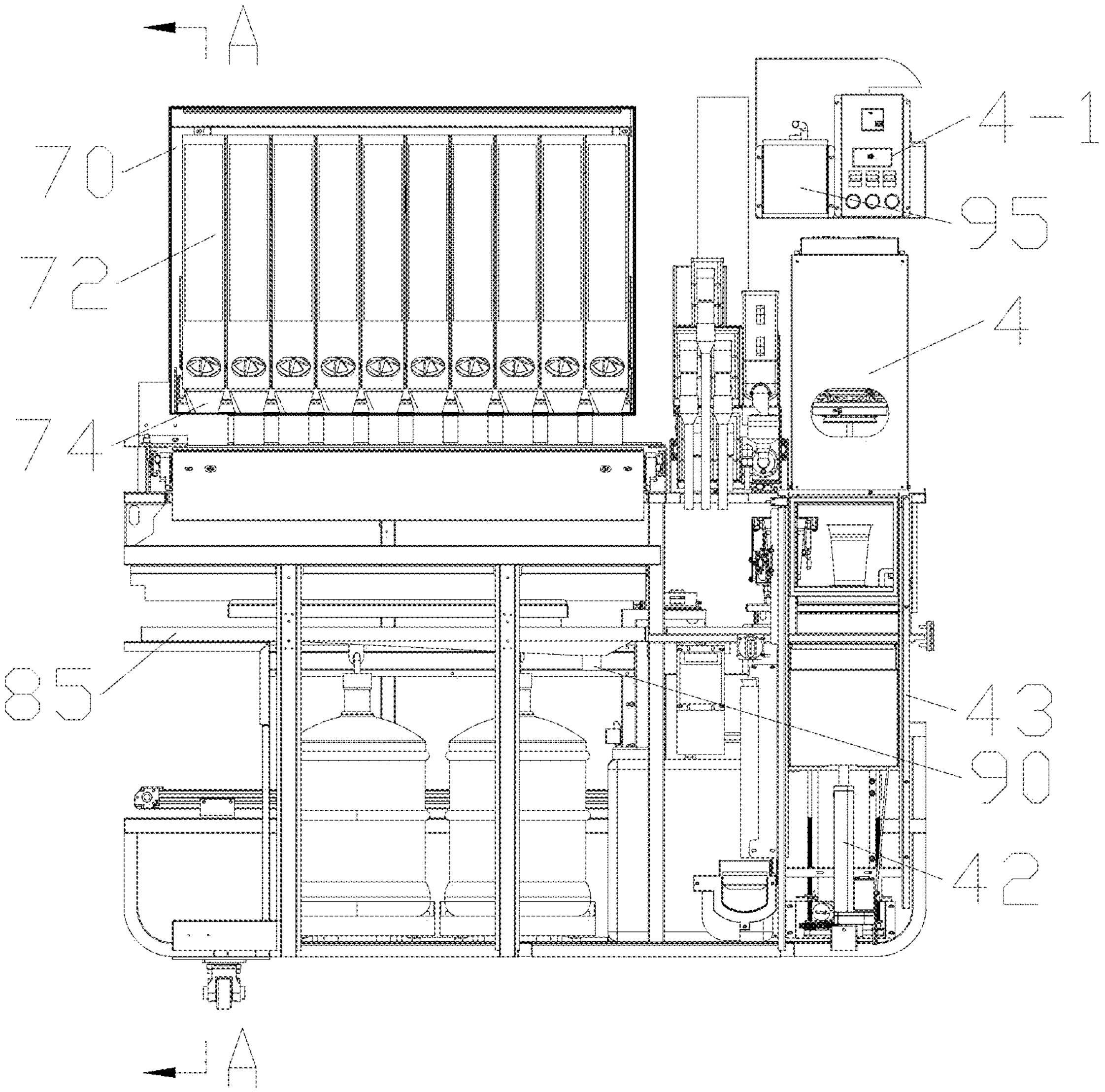
FIG. 6 is a third internal structural view of the fruit and vegetable smoothie automatic vending machine according to the present invention.
Figure 7:
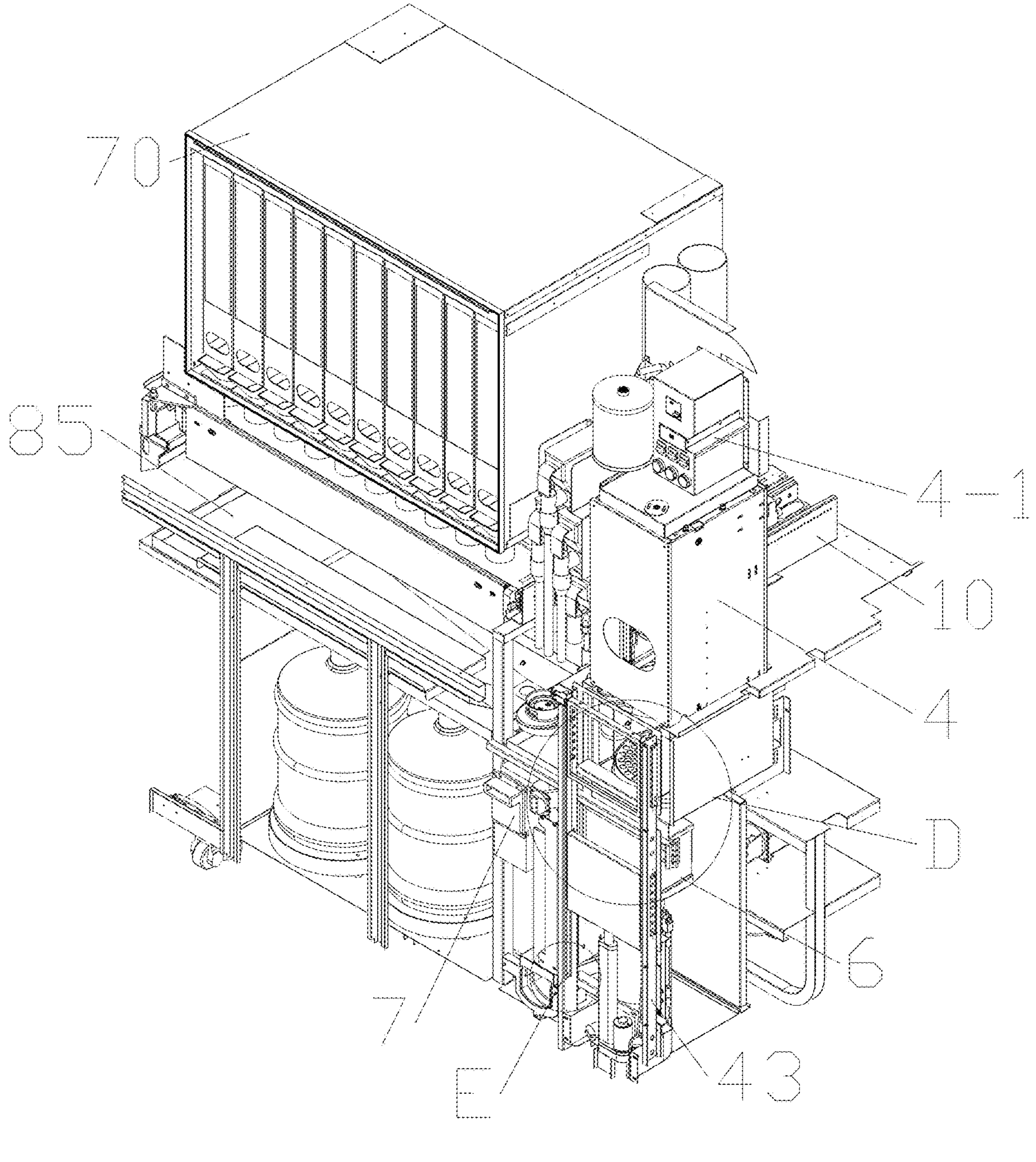
FIG. 7 is a fourth internal structural view of the fruit and vegetable smoothie automatic vending machine according to the present invention.
Figure 8:
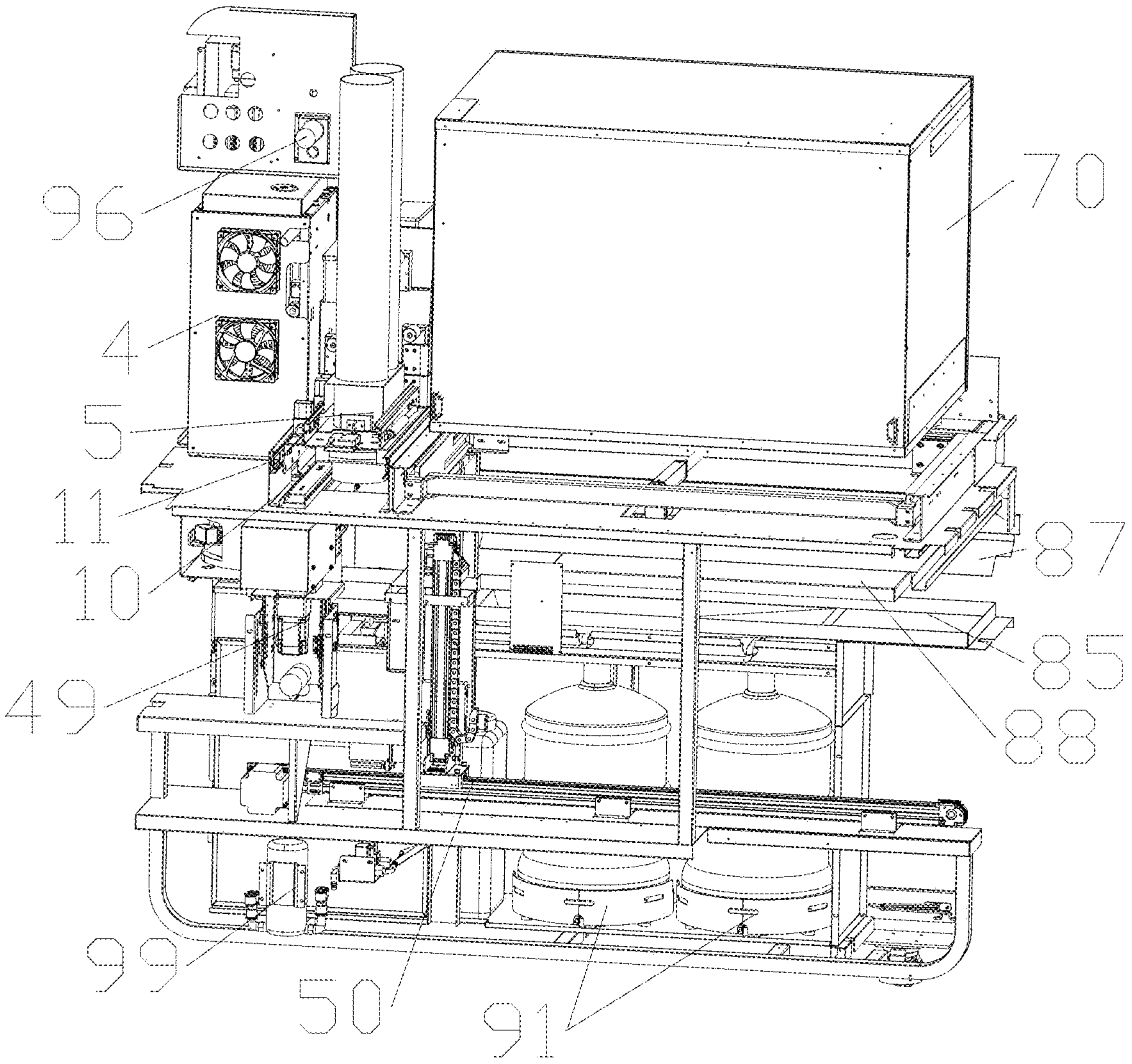
FIG. 8 is a fifth internal structural view of the fruit and vegetable smoothie automatic vending machine according to the present invention.
Figure 9:
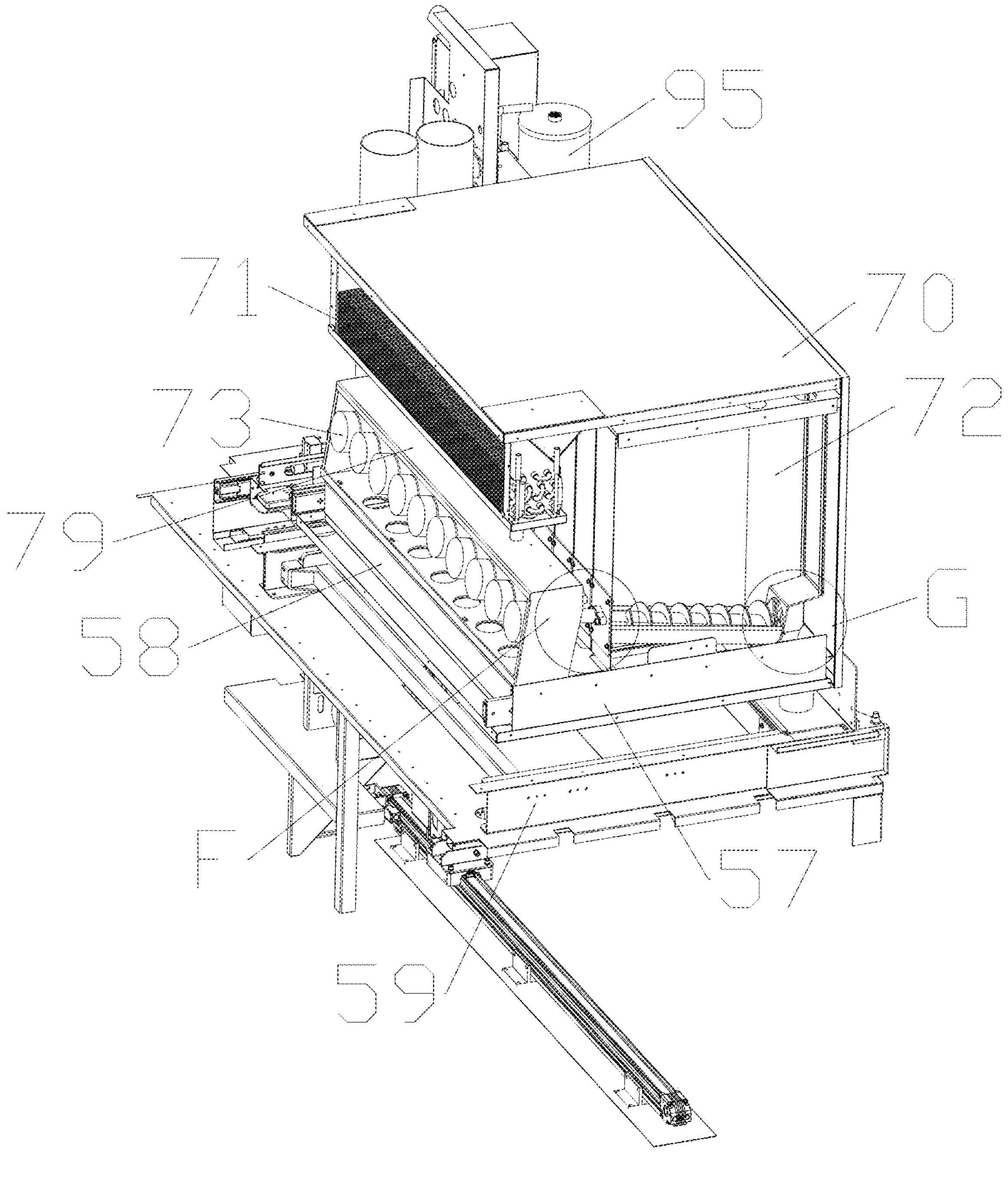
FIG. 9 is a structural view of the fruit particle storage mechanism of the fruit and vegetable smoothie automatic vending machine according to the present invention.
Figure 10:
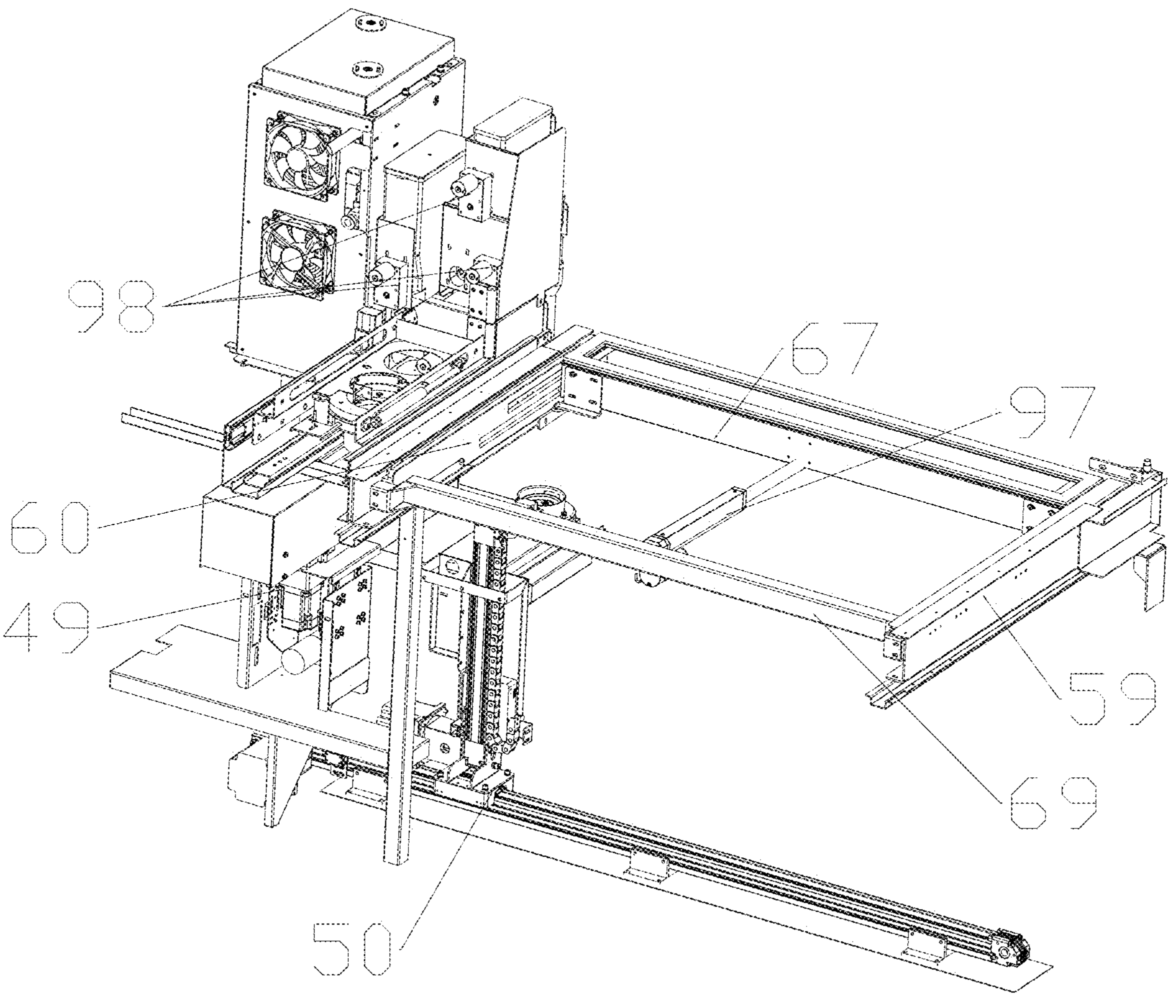
FIG. 10 is a perspective view of the transfer mechanism of the fruit and vegetable smoothie automatic vending machine according to the present invention.
Figure 11:
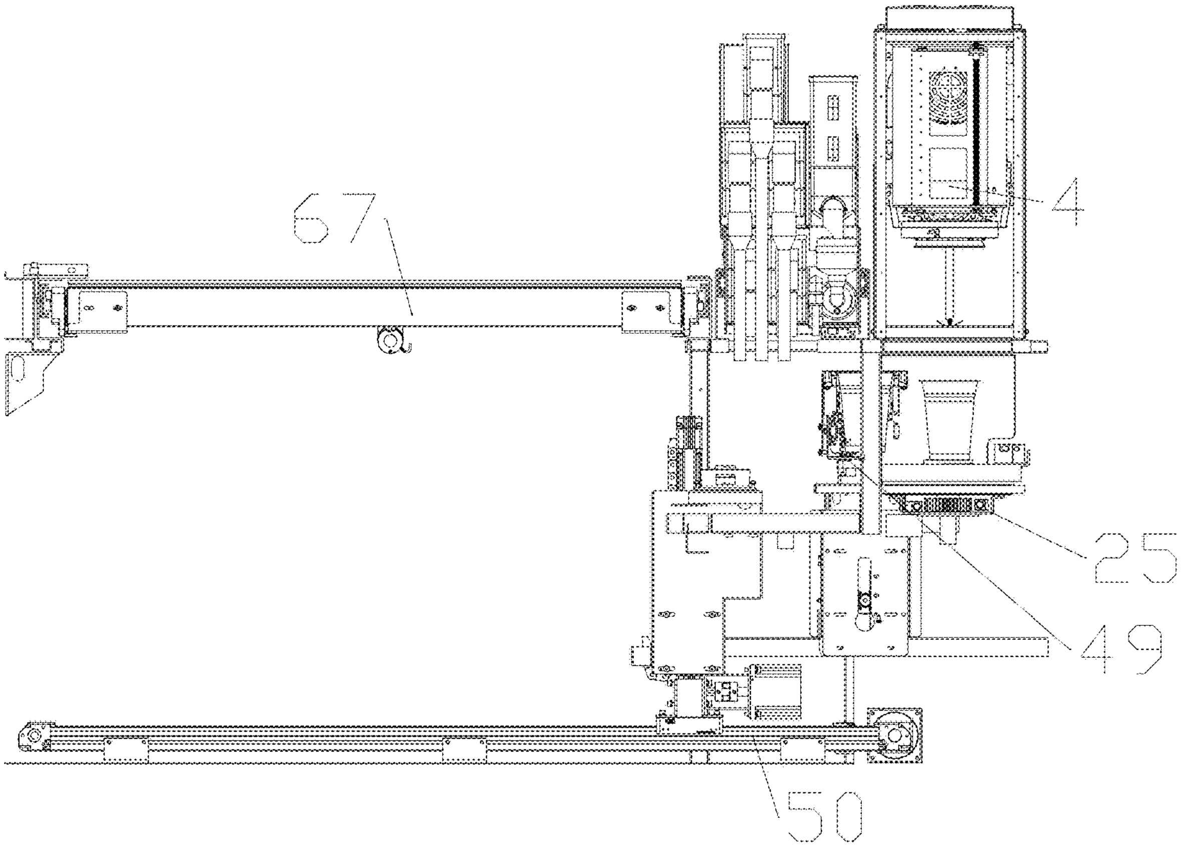
FIG. 11 is a front view of the transfer mechanism of the fruit and vegetable smoothie automatic vending machine according to the present invention.
Figure 12:
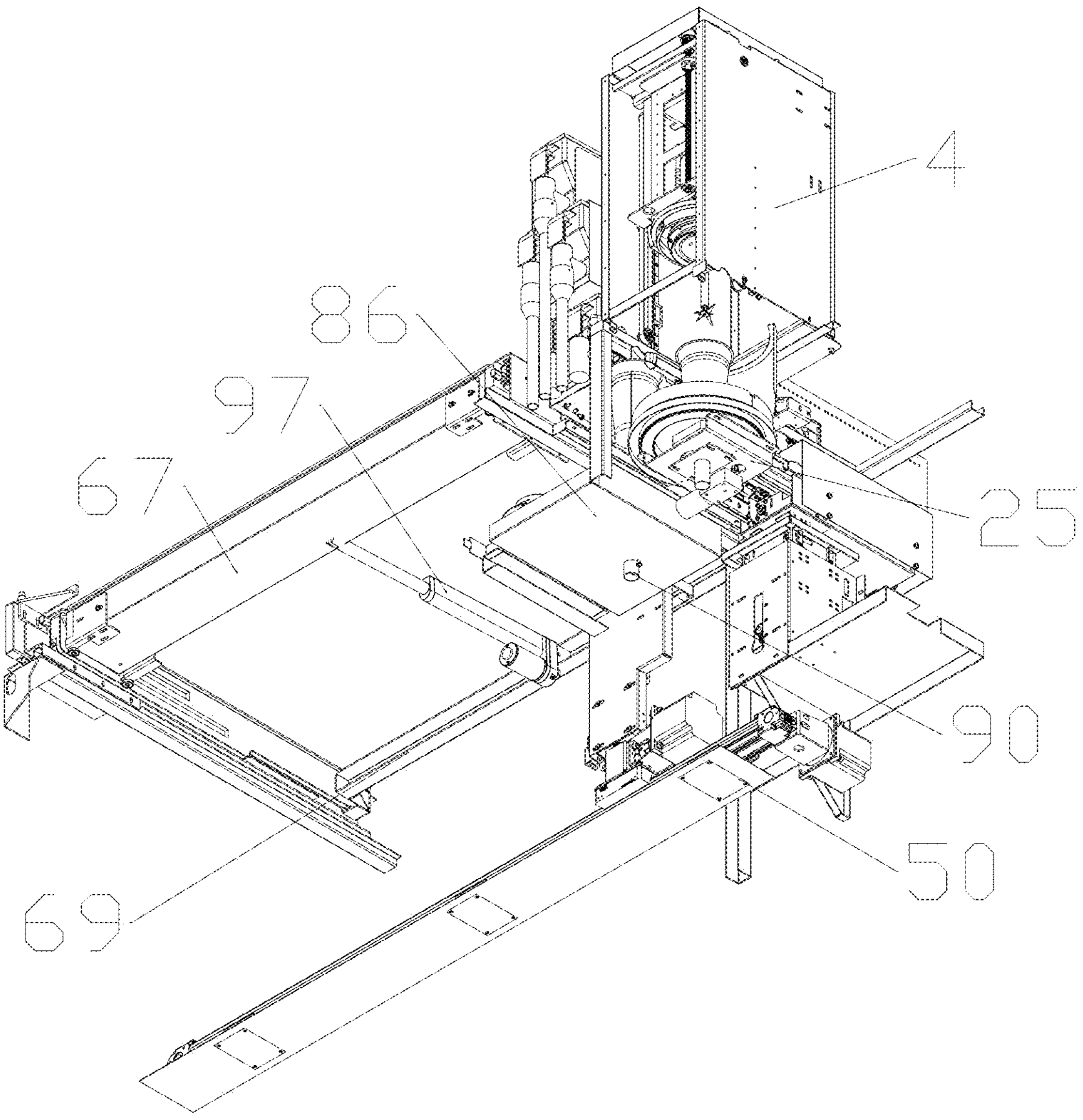
FIG. 12 is a bottom perspective view of the transfer mechanism of the fruit and vegetable smoothie automatic vending machine according to the present invention.
Figure 13:
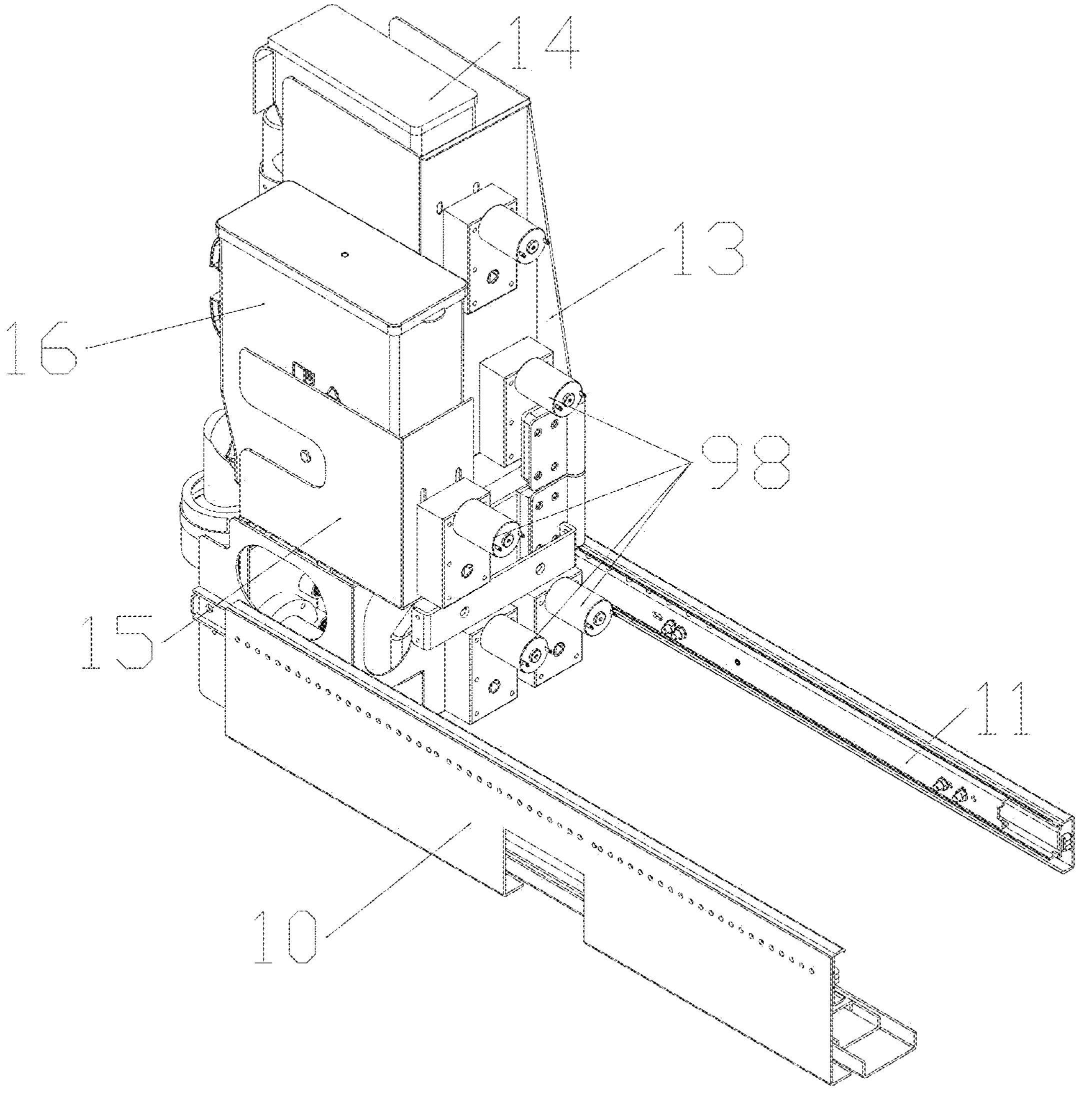
FIG. 13 is a rear perspective view of the material feeding mechanism of the fruit and vegetable smoothie automatic vending machine according to the present invention.
Figure 14:
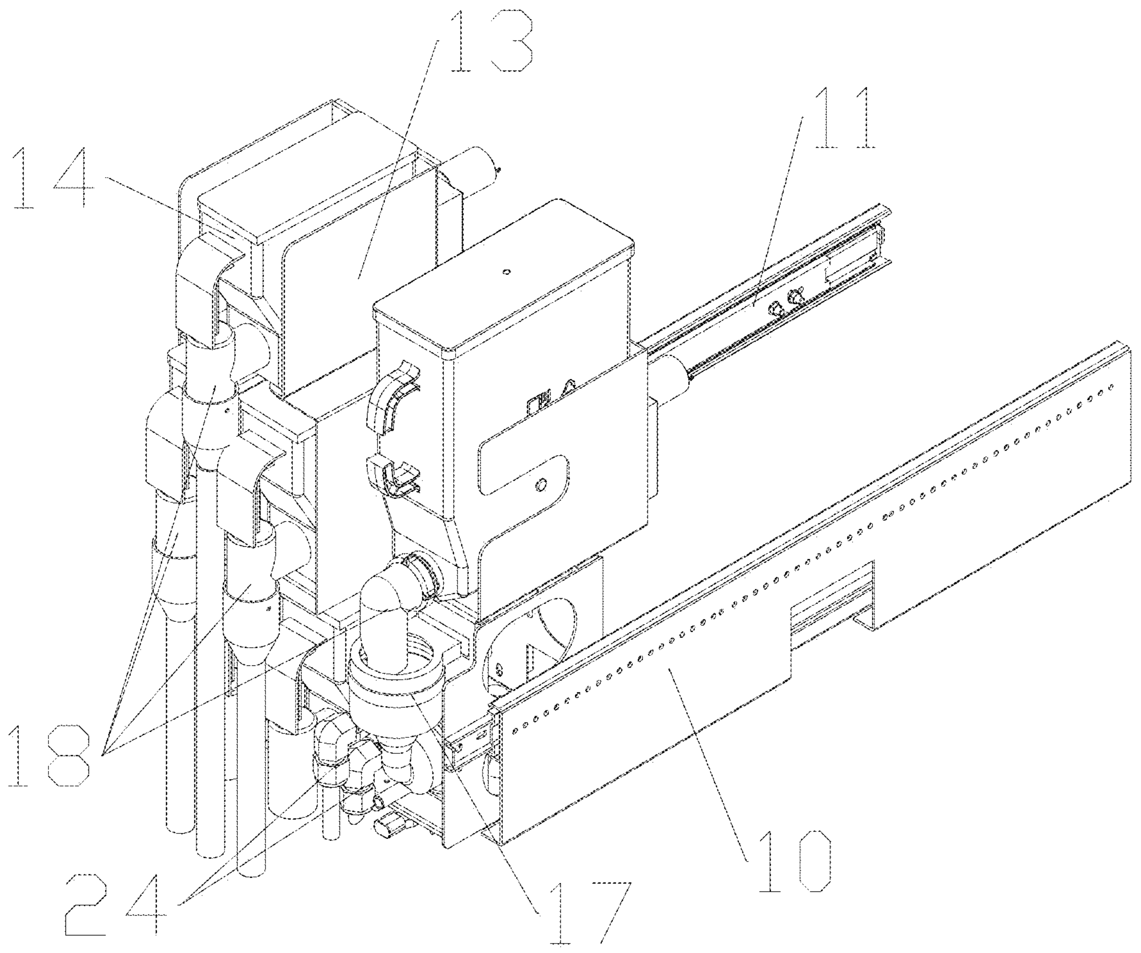
FIG. 14 is a front perspective view of the material feeding mechanism of the fruit and vegetable smoothie automatic vending machine according to the present invention.
Figure 15:
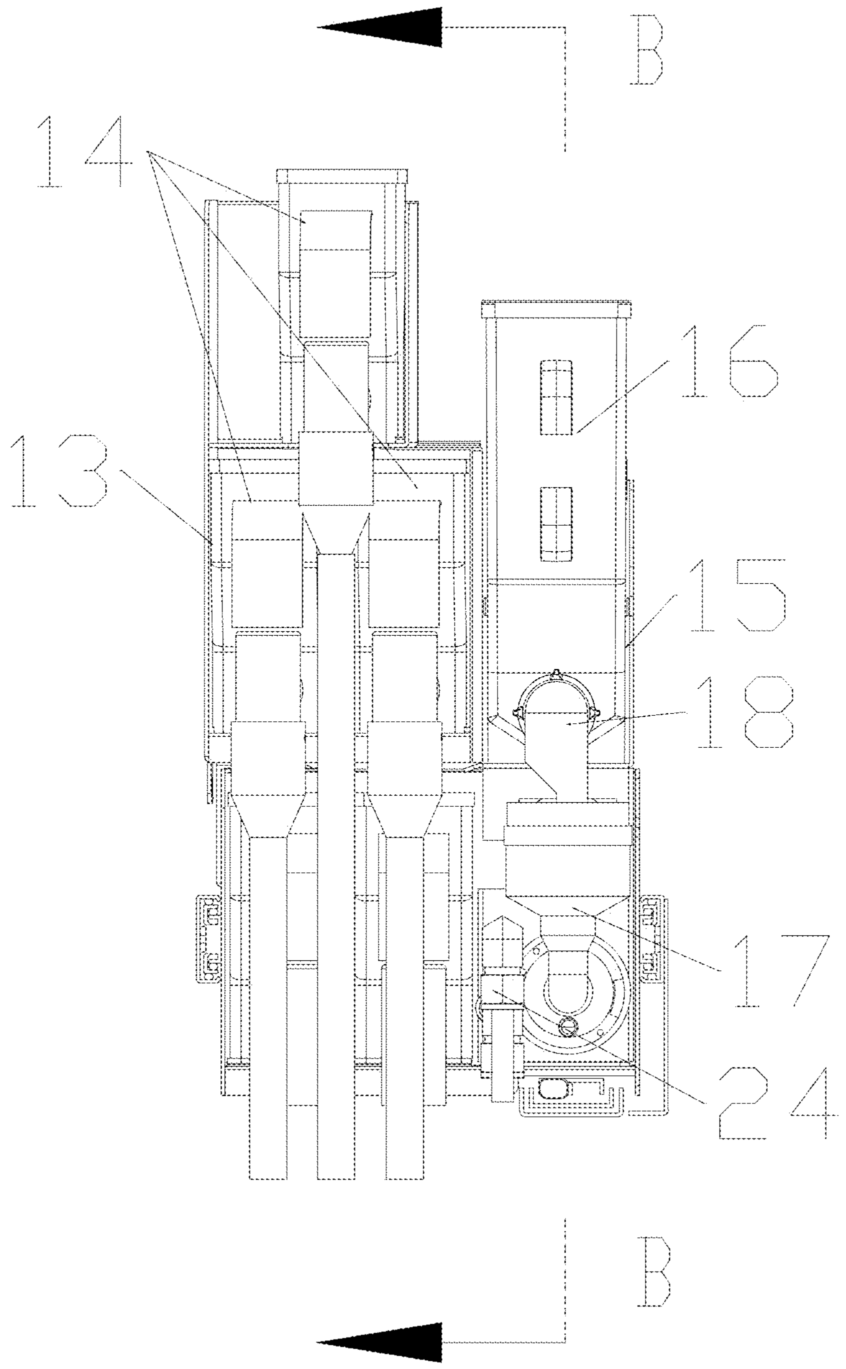
FIG. 15 is a front view of the material feeding mechanism of the fruit and vegetable smoothie automatic vending machine according to the present invention.
Figure 16:
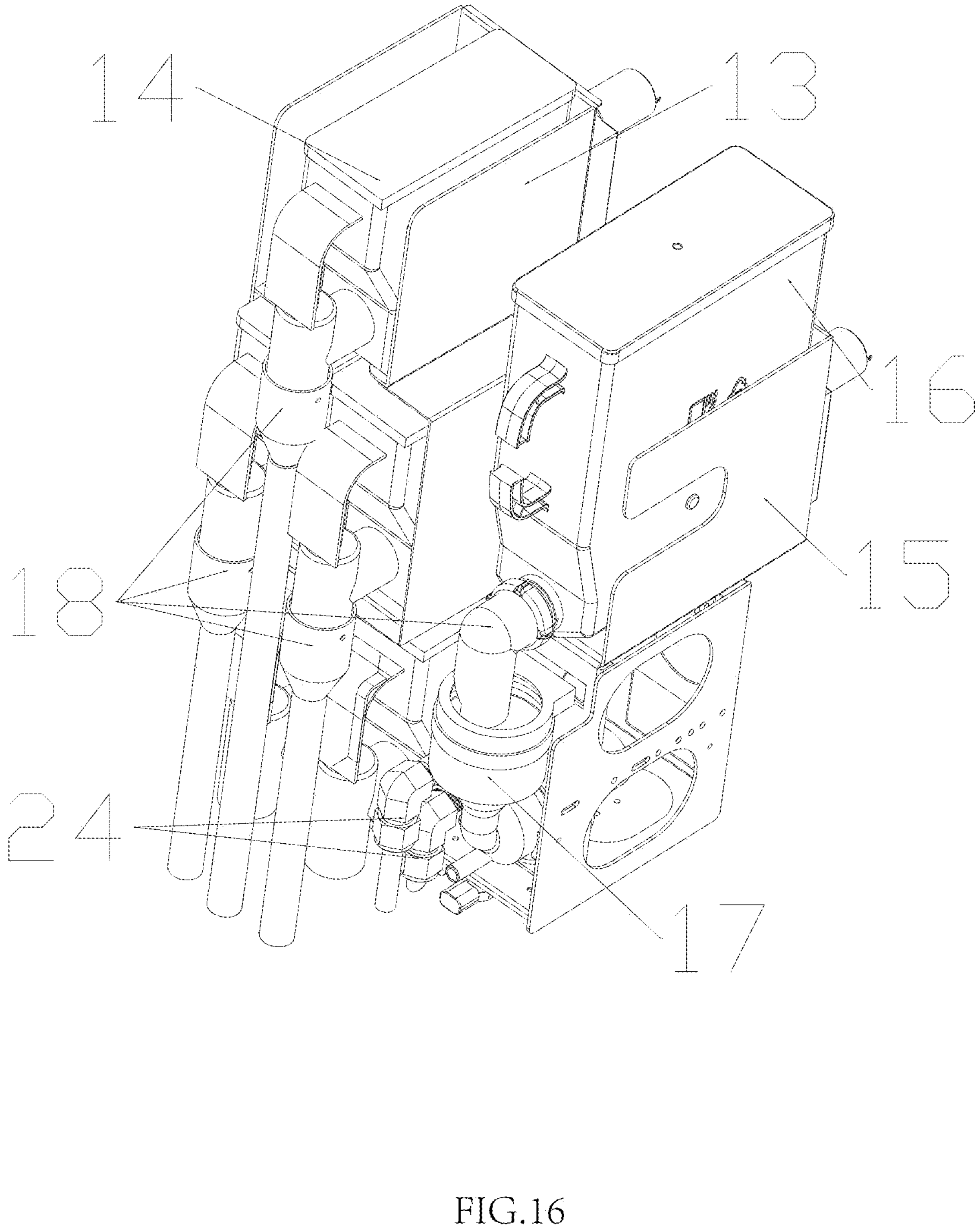
FIG. 16 is a perspective view of the material feeding mechanism of the fruit and vegetable smoothie automatic vending machine according to the present invention.
Figure 17:
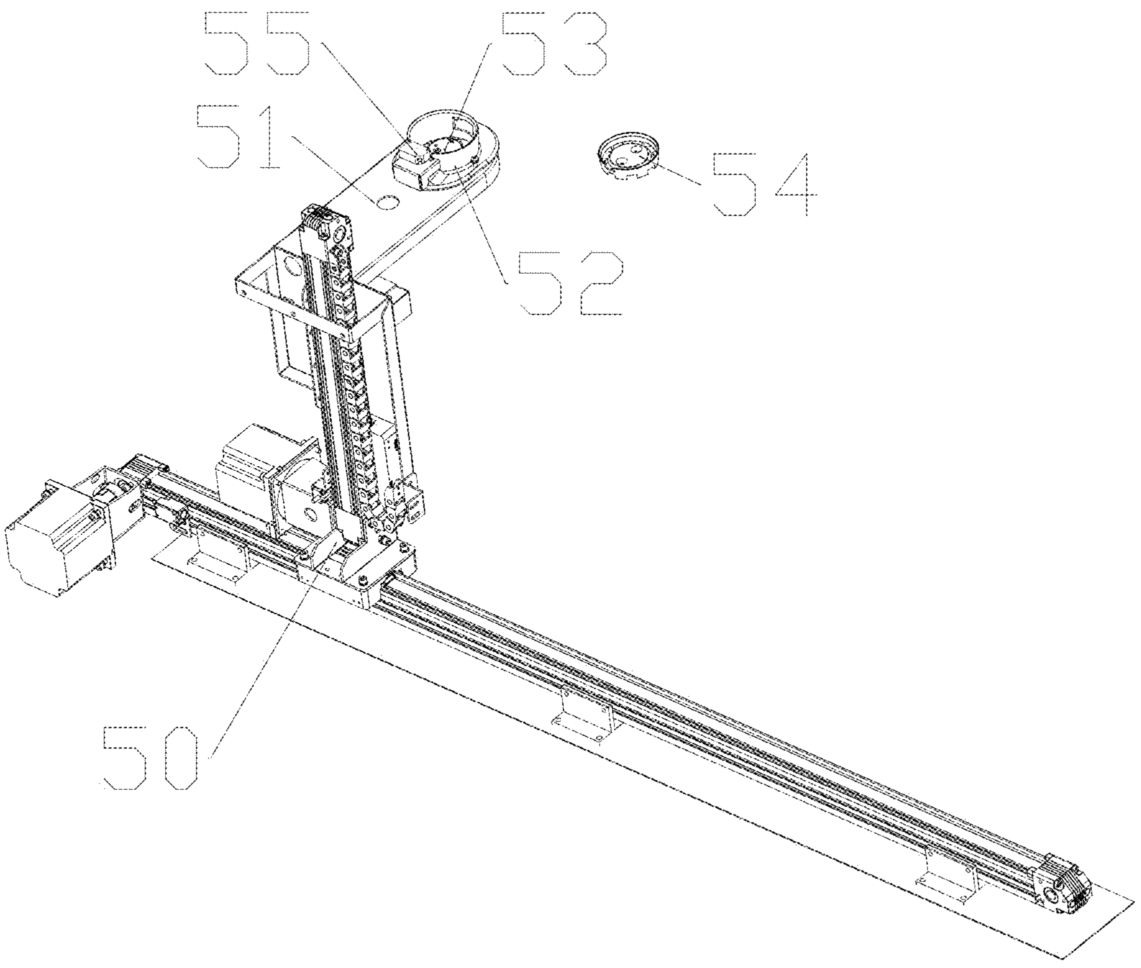
FIG. 17 is an exploded view of the XZ dual-axis linear module of the fruit and vegetable smoothie automatic vending machine according to the present invention.
Figure 18:
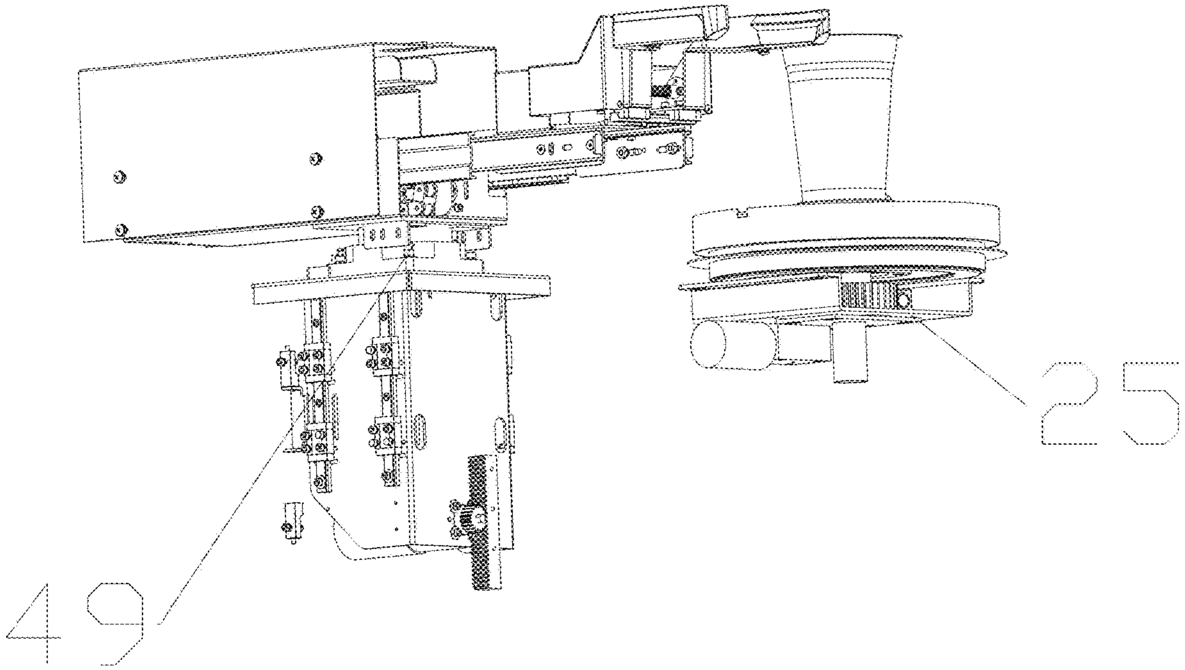
FIG. 18 is a structural view of the gripper-equipped mechanical arm of the fruit and vegetable smoothie automatic vending machine according to the present invention.
Figure 19:
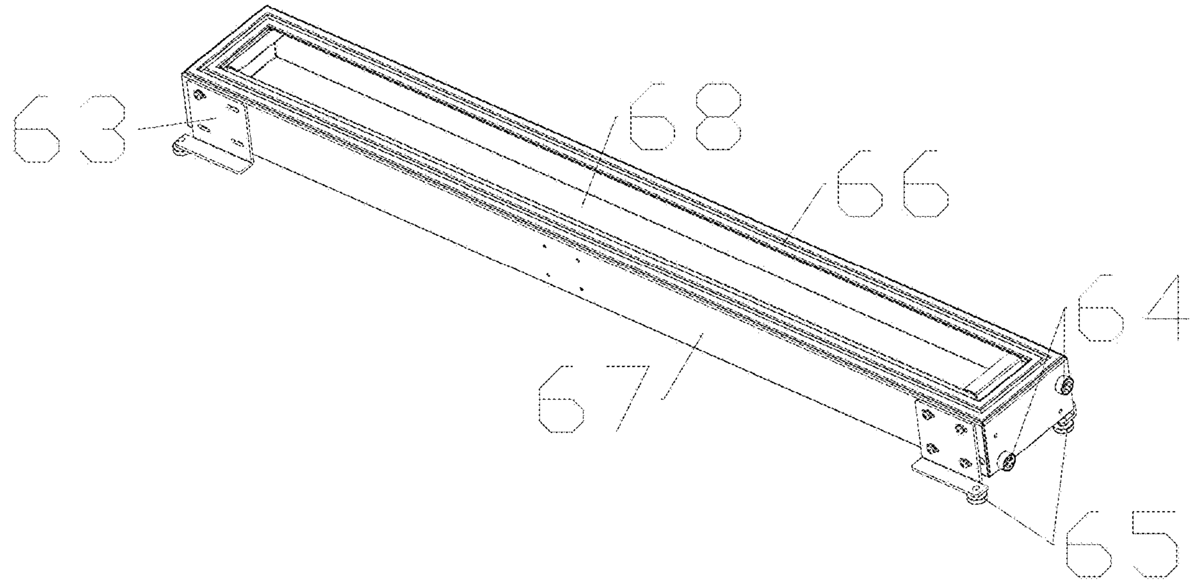
FIG. 19 is a structural view of the wheel bracket and base shell of the fruit and vegetable smoothie automatic vending machine according to the present invention.
Figure 20:
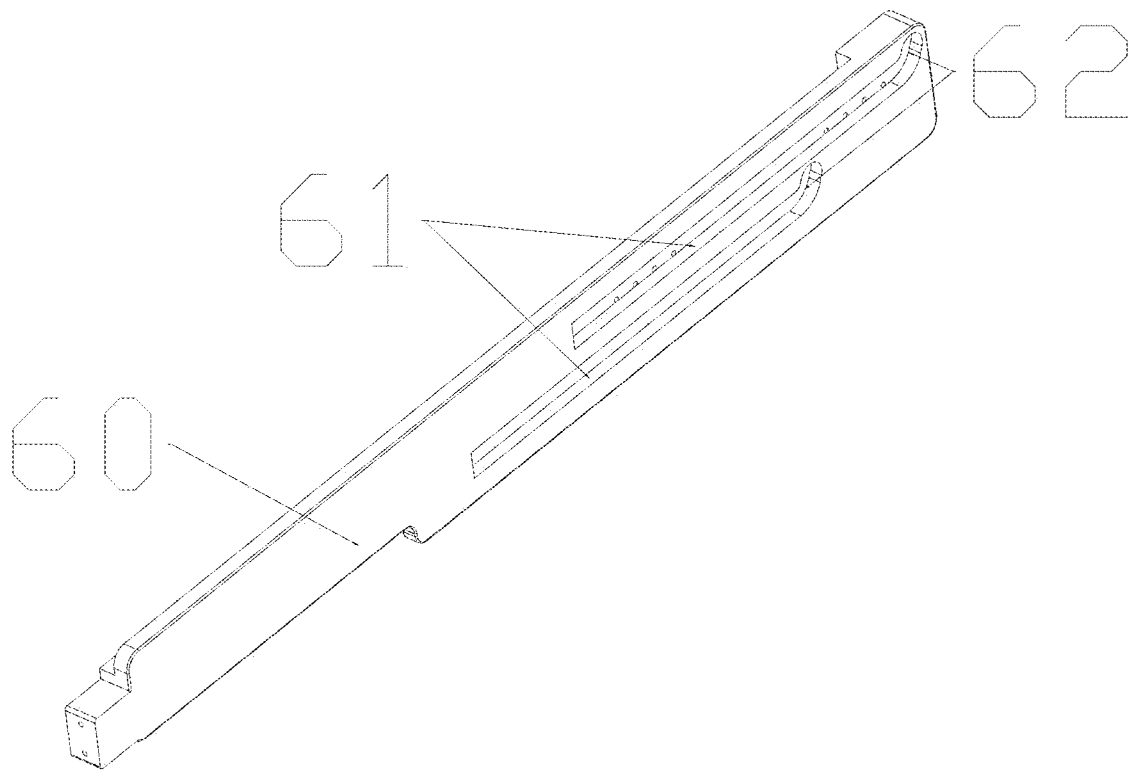
FIG. 20 is a structural view of the track plate of the fruit and vegetable smoothie automatic vending machine according to the present invention.
Figure 21:
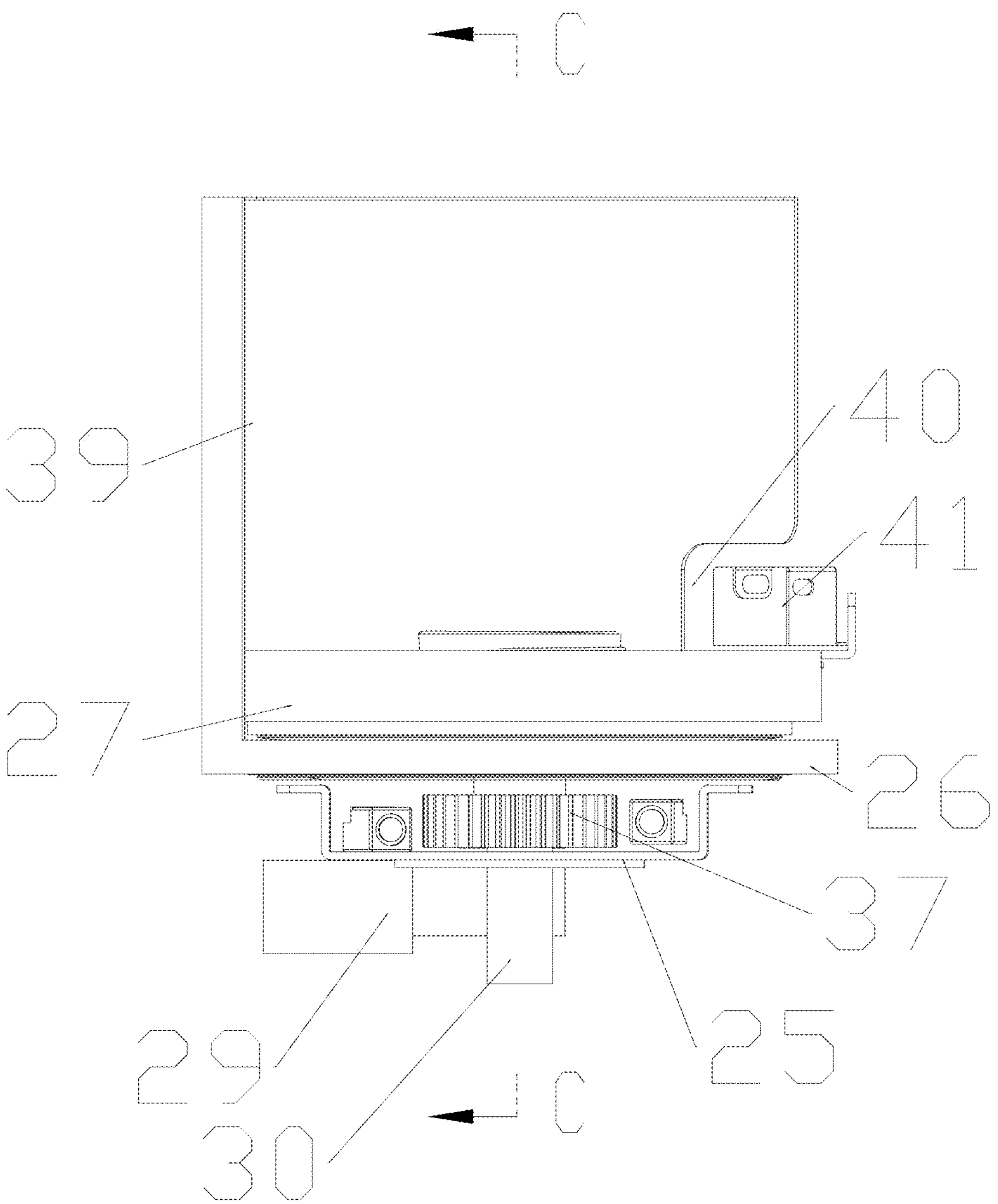
FIG. 21 is a structural view of the water flushing mechanism of the fruit and vegetable smoothie automatic vending machine according to the present invention.
Figure 22:
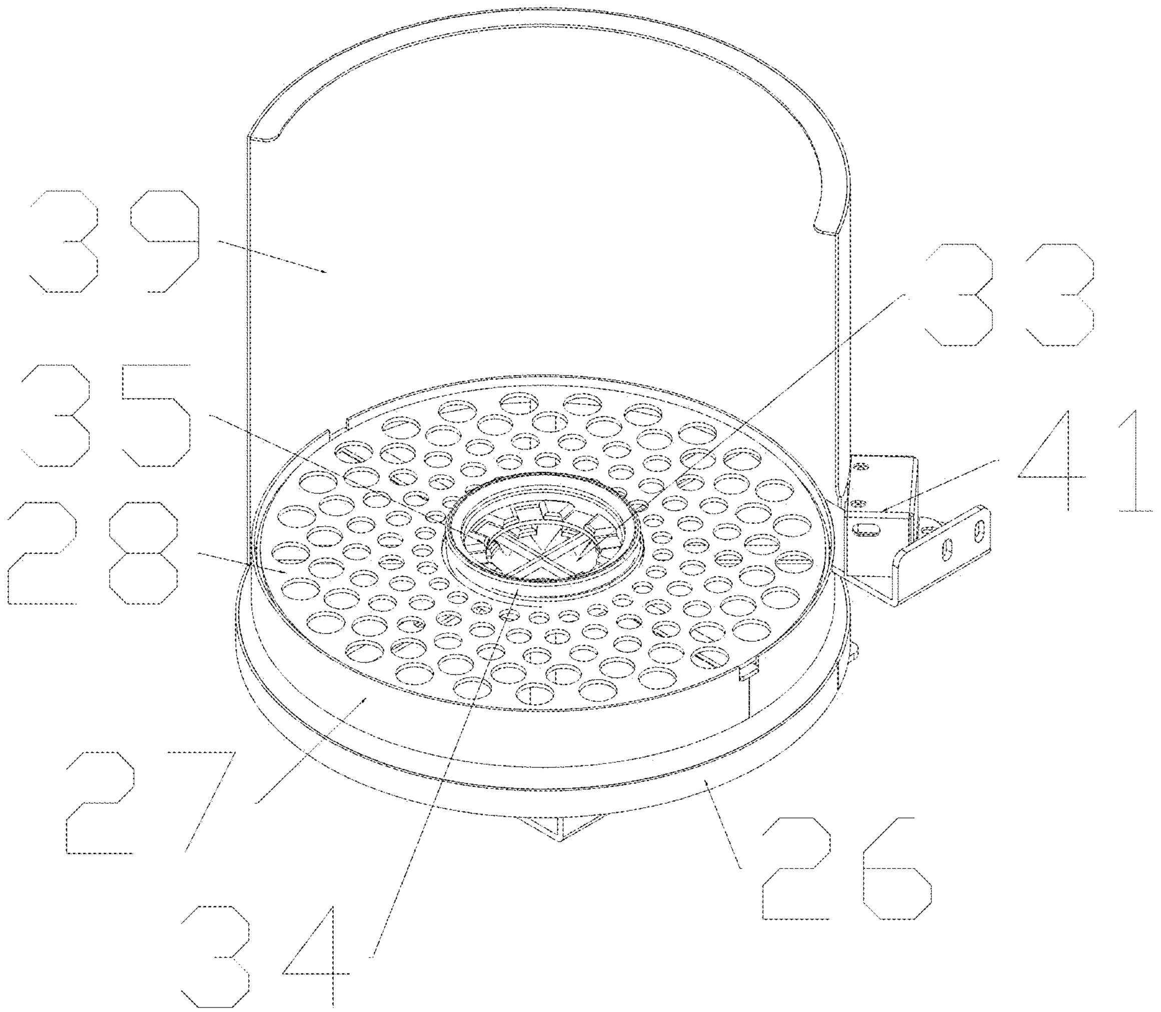
FIG. 22 is a perspective view of the water flushing mechanism of the fruit and vegetable smoothie automatic vending machine according to the present invention.
Figure 23:
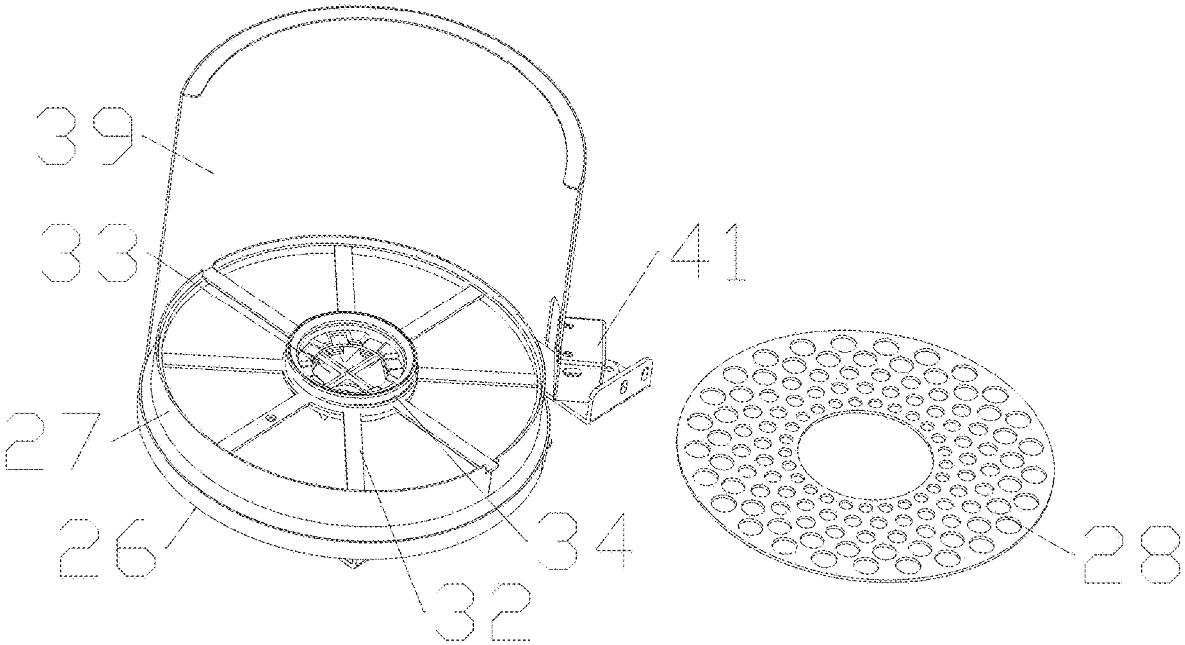
FIG. 23 is an exploded view of the water flushing mechanism of the fruit and vegetable smoothie automatic vending machine according to the present invention.
Figure 24:
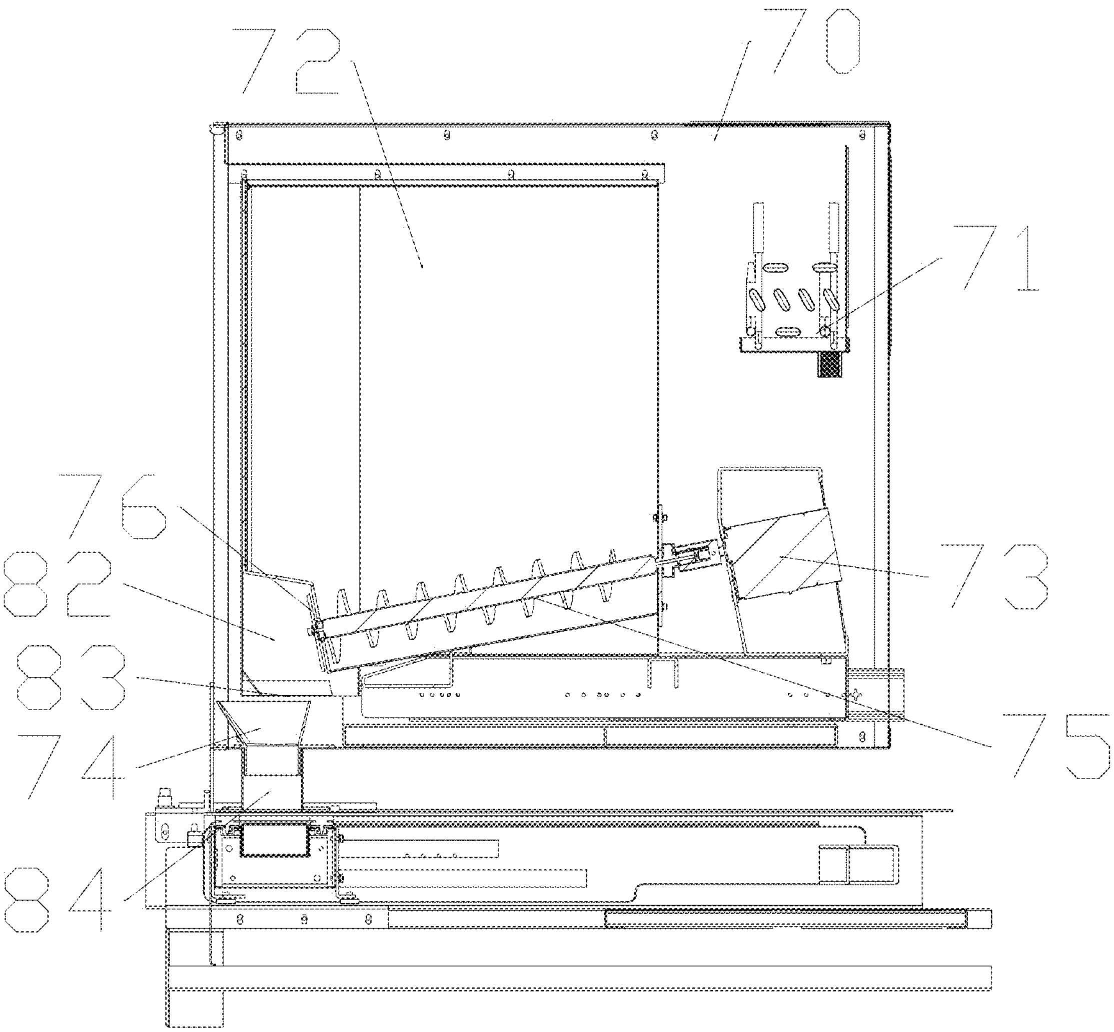
FIG. 24 is a cross-sectional view taken along line A-A in FIG. 6.
Figure 25:
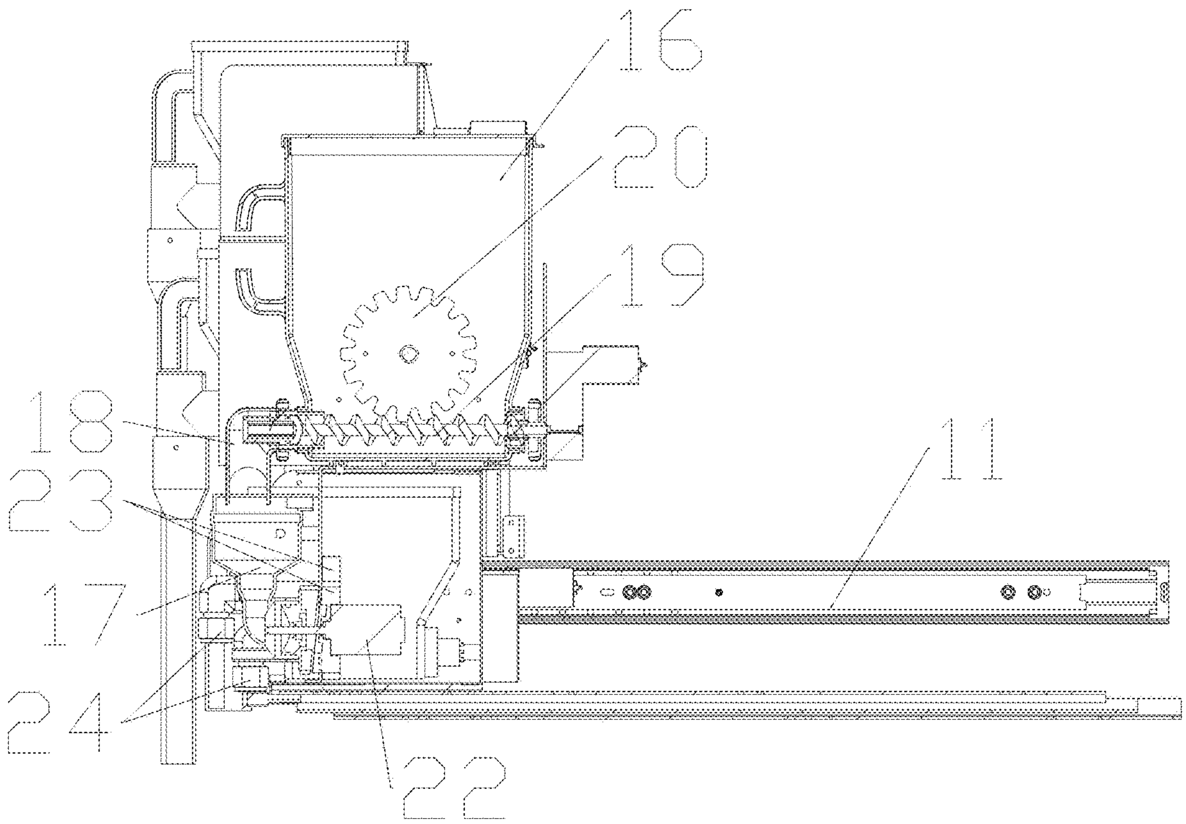
FIG. 25 is a cross-sectional view taken along line B-B in FIG. 15.
Figure 26:
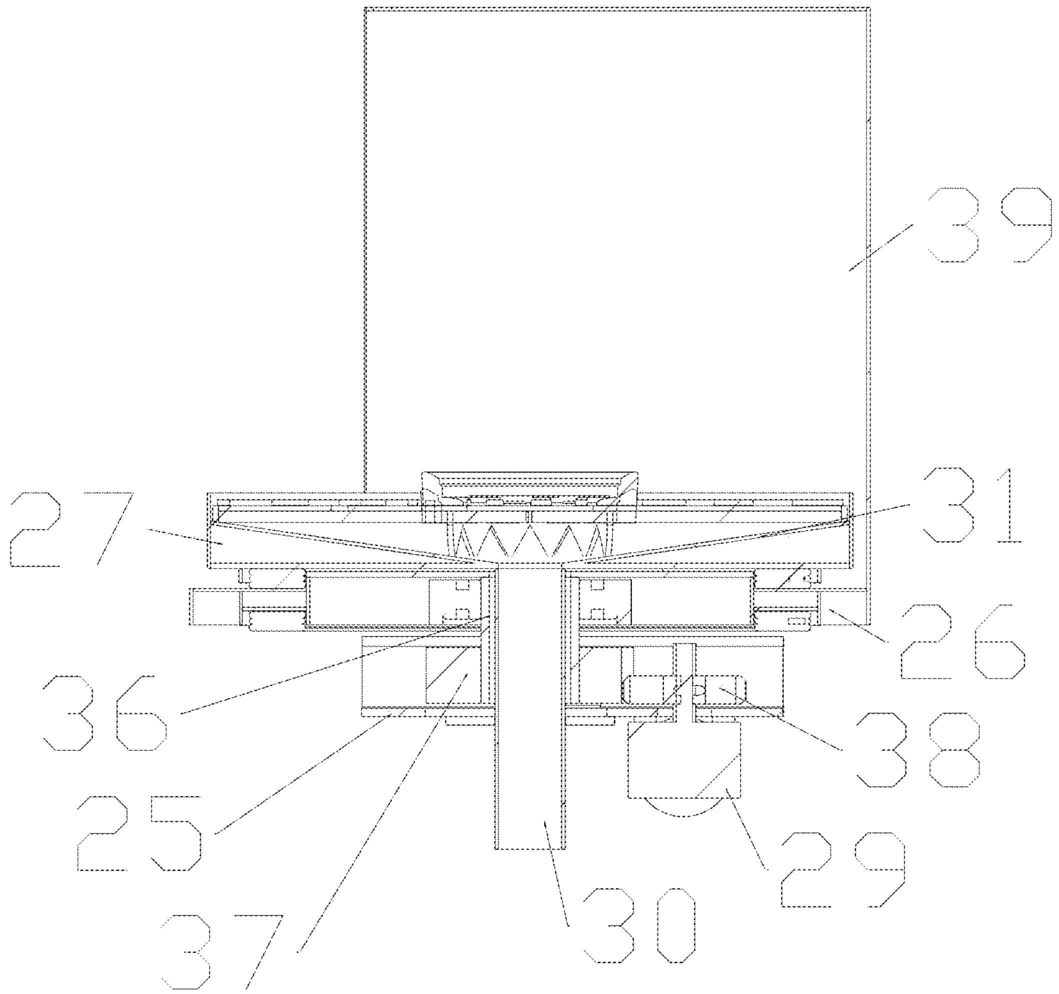
FIG. 26 is a cross-sectional view taken along line C-C in FIG. 21.
Figure 27:
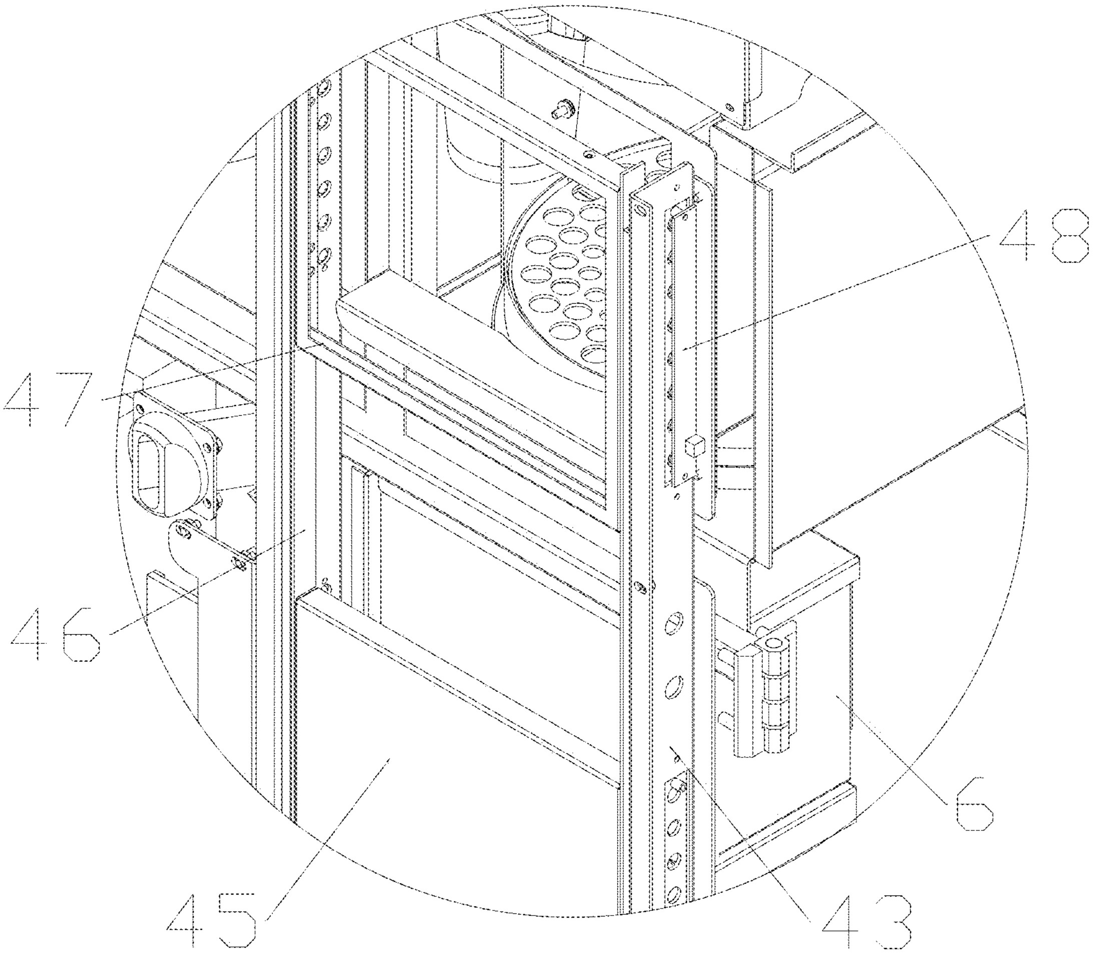
FIG. 27 is a partial enlarged view of portion D in FIG. 7.
Figure 28:
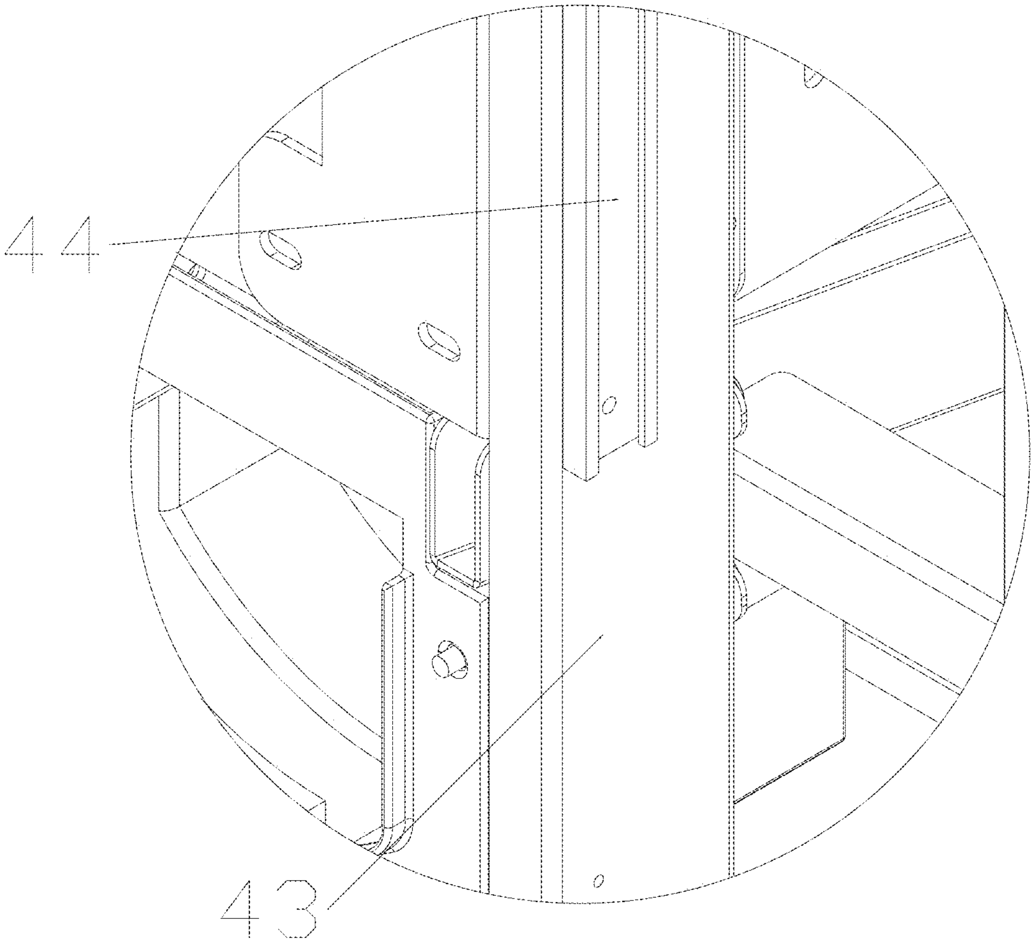
FIG. 28 is a partial enlarged view of portion E in FIG. 7.
Figure 29:
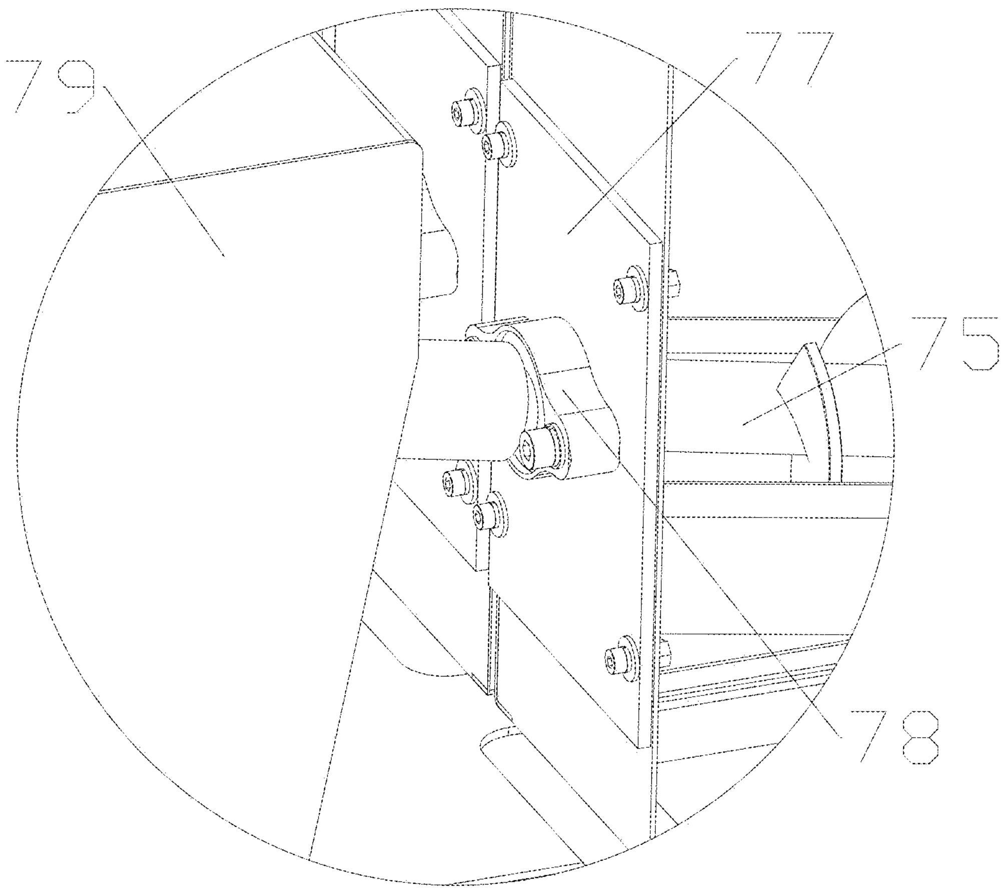
FIG. 29 is a partial enlarged view of portion F in FIG. 9.
Figure 30:
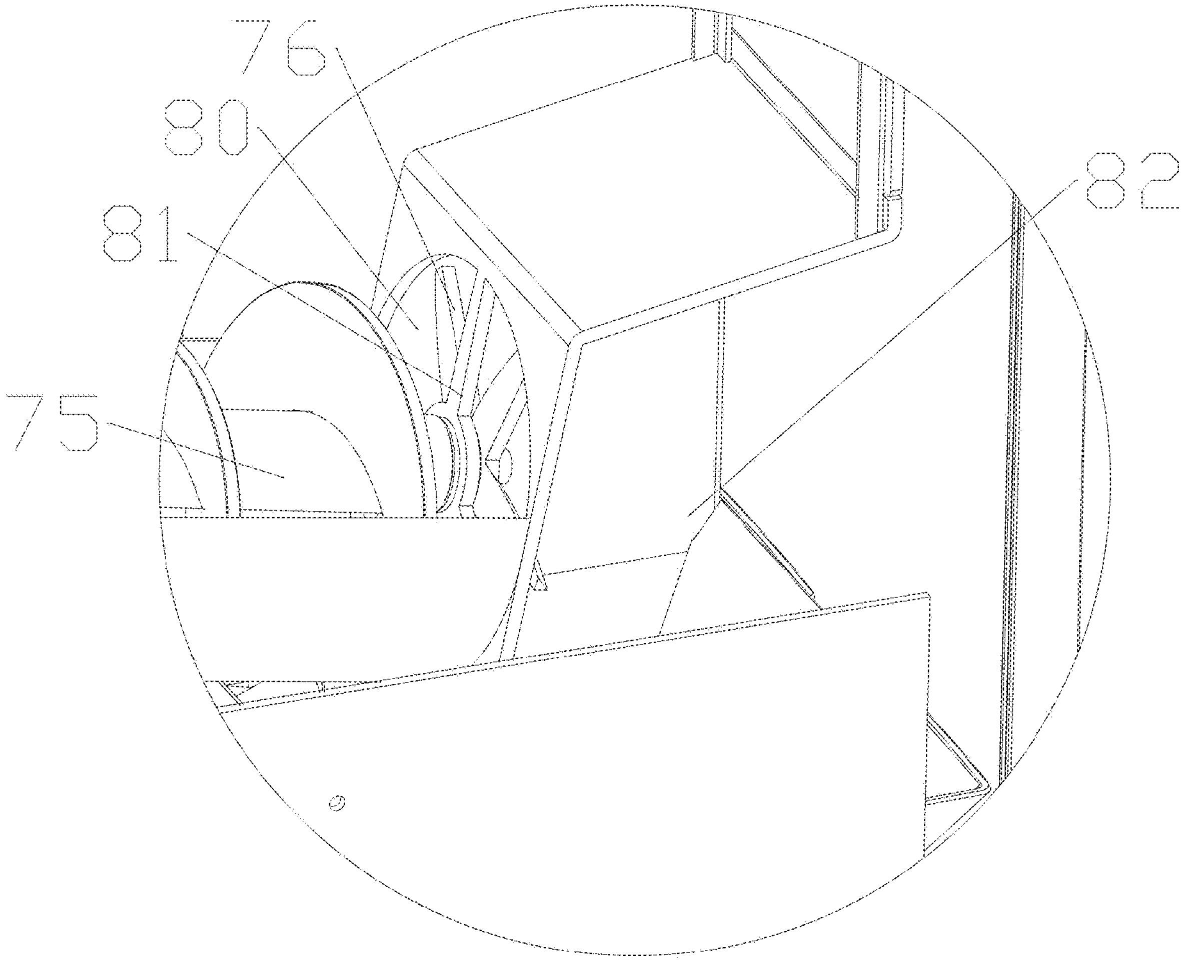
FIG. 30 is a partial enlarged view of portion G in FIG. 9.

With reference to FIGS. 1-30, a fruit and vegetable smoothie automatic vending machine is characterized in that it comprises a housing 1, a vending unit, and a beverage preparation mechanism. The vending unit is arranged inside the housing 1. The beverage preparation mechanism is arranged on one side of the vending unit inside the housing 1. The vending unit produces fruit cups and conveys them to the beverage preparation mechanism to be processed into fruit and vegetable smoothie beverages.

It further comprises a refrigeration system 2 and a control system 3. The refrigeration system 2 is arranged at a bottom inside the housing 1 and supplies cold air for the equipment. The control system 3 is arranged at a rear inside the housing 1 and is used to control the entire equipment.

Specifically, the refrigeration system 2 adopts a dual-compressor refrigeration equipment from the prior art. A fan of the dual-compressor refrigeration equipment delivers cold air to the freezing cabinet 56 to refrigerate the interior of the freezing cabinet 56, which can achieve a freezing temperature of −18 degrees Celsius. This provides better refrigeration, higher efficiency, and is conducive to the preservation of fresh fruit cups, ensuring hygiene, safety, good taste restoration, and minimizing product loss to the greatest extent.

The vending unit comprises a fruit particle storage mechanism, a transfer mechanism, and a waste collection mechanism. The fruit particle storage mechanism is arranged at an upper part inside the housing 1. The waste collection mechanism is arranged at a front part inside the housing 1. The waste collection mechanism is located below the fruit particle storage mechanism and is used to collect fruit particles falling from the fruit particle storage mechanism, and also to collect wastewater, etc., ensuring cleanliness and hygiene inside the machine.

The beverage preparation mechanism comprises an agitation device 4, a cup dispenser 5, a water flushing mechanism, a material feeding mechanism, a cover and tube access mechanism 6, and a self-service checkout machine 7. A front door 8 is provided at the front end of the housing 1. An item retrieval opening 9 is provided in the middle portion of the front door 8. The agitation device 4 is arranged inside the housing 1 and is located behind the item retrieval opening 9. The water flushing mechanism is arranged directly below the agitation device 4. A slide rail frame 10 is provided on one side of the agitation device 4 inside the housing 1. Drawer slide rails 11 are provided on both inner side walls of the slide rail frame 10. The material feeding mechanism is arranged inside the slide rail frame 10, and both sides thereof are respectively connected to the corresponding drawer slide rails 11. The cup dispenser 5 is arranged inside the slide rail frame 10, and both sides thereof are respectively connected to the corresponding drawer slide rails 11. The cup dispenser 5 is located behind the material feeding mechanism.

Specifically, when it is necessary to replenish cups in the cup dispenser 5, the cup dispenser 5 can be pulled partially out towards the rear end. Cups are then placed into the cup dispenser 5, after which the cup dispenser 5 is manually pushed back to its original position. Note for cup replenishment: Remove the cups from their packaging and inspect them individually to ensure they are not stuck together; if two cups are stuck together and dispensed simultaneously, it may cause a mechanical failure or damage the machine.

A cover retrieval opening 12 is provided below the item retrieval opening 9 at the upper end of the front door 8. A cup and tube door mechanism is provided on the inner wall of the front door 8. The cup and tube door mechanism cooperates with the cover retrieval opening 12 and the item retrieval opening 9 to simultaneously close and open the cover retrieval opening 12 and the item retrieval opening 9. This enables the simultaneous opening and closing of the cover retrieval opening 12 and the item retrieval opening 9, making it convenient for the purchaser to retrieve the prepared smoothie cup, lid, and straw. After retrieval, the cup and tube door mechanism closes the cover retrieval opening 12 and the item retrieval opening 9, ensuring cleanliness and hygiene inside the machine.

The cover and tube access mechanism 6 is provided at the rear end of the cup and tube door mechanism inside the housing 1. Specifically, the cover and tube access mechanism 6 employs the cup access mechanism described in U.S. patent application Ser. No. 19/271,824, filed on Jul. 17, 2025, corresponding particularly to the subject matter of claim 12 thereof. This mechanism enables automatic elevation of cup lids for convenient retrieval and also facilitates easy access to straws.

A self-service checkout machine 7 is provided on one side of the cover and tube access mechanism 6 inside the housing 1. This utilizes existing self-checkout technology equipped with electronic payment, card payment, cash and coin payment, and change dispensing functions. It is compatible with installation structures for various payment modules and can adapt to different payment methods, providing convenient payment options for users.

Specifically, the agitation device 4 employs the agitation device described in claims 1-5 of Chinese Patent Application No. 2022231183916, filed on Nov. 23, 2022. During the process of rotating, mixing, and crushing materials within a container, this agitation device effectively prevents the internal materials from splashing, thereby avoiding contamination of the interior of the fruit smoothie automatic vending machine.

An agitation controller 4-1 is provided above the agitation device 4 inside the housing 1. The agitation controller 4-1 is electrically connected to the control system 3 and is configured to execute commands from the control system 3, controlling the agitation device 4 to perform corresponding operations.

A display screen 21 is provided in the upper middle portion of the front door 8. The display screen 21 is a touch screen, facilitating operation by purchasers, and is electrically connected to the control system 3.

During specific operation, the user selects either a pre-configured beverage recipe or chooses individual materials for a customized beverage on the display screen 21. After selection, the user makes a payment via the self-service checkout machine 7. Subsequently, the control system 3 directs the gripper-equipped mechanical arm 49 to retrieve an empty cup from the opening at the lower part of the cup dispenser 5. The gripper-equipped mechanical arm 49 transports the empty cup onto the waterproof cover 54 on the electronic scale 53 of the XZ dual-axis linear module 50. The XZ dual-axis linear module 50 then moves the empty cup under the corresponding discharge guide hopper 74 to receive ingredients. Simultaneously, the electronic scale 53 weighs the cup and feeds the data back to the control system 3. Once the total weight of the cup reaches the specified value, the gripper-equipped mechanical arm 49 removes the cup now containing fruits and/or vegetables and transports it under the material feeding mechanism to add the corresponding toppings. It is then delivered to the water flushing mechanism and placed into its placement trough 34. The gripper-equipped mechanical arm 49 then retracts, and the agitation device 4 is controlled to process the materials within the cup into a smoothie beverage, achieving automated processing. During processing, the shroud and cover assembly of the agitation device 4 effectively prevents materials inside the cup from splashing during the rotating, mixing, and crushing operations, thereby avoiding contamination of the interior of the fruit smoothie automatic vending machine. Upon completion of processing, the cup and tube door mechanism activates, simultaneously opening the cover retrieval opening 12 and the item retrieval opening 9. The purchaser retrieves the prepared smoothie cup, along with a lid and a straw. After retrieval, the cup and tube door mechanism closes the cover retrieval opening 12 and the item retrieval opening 9, ensuring cleanliness and hygiene inside the machine.

The material feeding mechanism comprises an ingredient bin frame 13, ingredient bins 14, a milk container frame 15, a milk container 16, and a mixer 17. One side of the milk container frame 15 is connected to one side of the ingredient bin frame 13. The connected side of the milk container frame 15 and the connected side of the ingredient bin frame 13 are respectively connected to the drawer slide rails 11. The milk container 16 is placed inside the milk container frame 15. Dairy products are added to the milk container 16, which can enhance the taste of the smoothie beverage.

A plurality of ingredient bins 14 are placed within the ingredient bin frame 13. Customized frozen crushed cubes, yogurt, acai berries, and other high-quality additives, along with other nutritionally rich ingredients, are placed into the respective ingredient bins 14. These can enhance the texture and flavor of the smoothie while providing probiotics and antioxidants.

A discharge tube 18 is provided at a lower part of the front end of each of the milk container 16 and the ingredient bins 14. A feed motor 98 is provided at the rear end of each of the milk container 16 and the ingredient bins 14. A first conveying screw shaft 19 is provided at the bottom inside each of the milk container 16 and the ingredient bins 14. A rear end of the first conveying screw shaft 19 is connected to a shaft of the corresponding feed motor 98. A front end of the first conveying screw shaft 19 is located within the discharge tube 18. A spiral blade of the first conveying screw shaft 19 is in tight contact with the discharge tube 18.

Thus, when the feed motor 98 rotates, it drives the first conveying screw shaft 19 to rotate, thereby conveying the ingredients from within the ingredient bin 14 or milk container 16 outward. When the first conveying screw shaft 19 is not rotating, the spiral blade located within the discharge tube 18 remains in tight contact, thereby blocking the outflow of ingredients from the milk container 16 and the ingredient bins 14.

A bevel gear 20 meshing with the first conveying screw shaft 19 is rotatably provided inside the milk container 16. Thus, when the first conveying screw shaft 19 rotates, it drives the bevel gear 20 to rotate, which in turn agitates the dairy products within the milk container 16 via the bevel gear 20, preventing sedimentation of the dairy products.

The mixer 17 is provided on the milk container frame 15 below the discharge tube 18. A lower end of the discharge tube 18 on the milk container 16 extends into an interior of the mixer 17. A mixing motor 22 is provided at a rear part of a lower end of the mixer 17. A rotating shaft of the mixing motor 22 extends into the mixer 17. During use, an agitation blade or the like is installed on the rotating shaft of the mixing motor 22 extending into the mixer 17. This allows for the stirring and mixing of dairy products entering the mixer 17, preventing clumping or similar issues in the dairy products. A discharge channel is provided at a front end of the mixer 17 for discharging the dairy products. A plurality of internally threaded tubes 23 are provided on one side of the mixer 17 on the milk container frame 15; specifically, two internally threaded tubes 23 are provided. A quick-connect coupling 24 is provided at a front end of each internally threaded tube 23.

A storage rack is provided on one side of the agitation controller 4-1 inside the housing 1. A viscous liquid container 95 is arranged on the storage rack. A peristaltic pump 96 is arranged on the storage rack. The peristaltic pump 96 is connected to the viscous liquid container 95 via a pipeline. The peristaltic pump 96 is connected to one of the internally threaded tubes 23 via a pipeline and discharges liquid through the corresponding quick-connect coupling 24. Natural sweeteners and flavor enhancers, such as honey (providing natural sweetness) and agave syrup (providing a vegan alternative), can be contained within the viscous liquid container 95.

The water flushing mechanism comprises a base frame 25, a rotating frame 26, a drip tray 27, a perforated drainage plate 28, and a right-angle motor 29. The base frame 25 is fixed inside the housing 1. A drip tray tube 30 is provided on the base frame 25. The drip tray 27 is provided on an upper end of the drip tray tube 30. A tapered cylinder 31 is provided inside the drip tray 27 to facilitate rapid water drainage. A bottom of the tapered cylinder 31 communicates with the drip tray tube 30. A three-way solenoid valve is installed below the drip tray tube 30 inside the housing 1. One port of the three-way solenoid valve is connected to the waste collection bucket 89 via a pipeline, and another port is connected to a water distributor via a pipeline.

A screen plate 32 is provided on an upper end of the tapered cylinder 31. A flush inlet 33 is provided at a center of the screen plate 32 directly above the drip tray tube 30. A placement trough 34 is provided on the screen plate 32 surrounding an outer periphery of the flush inlet 33. The perforated drainage plate 28 is placed on the screen plate 32 and sleeves an exterior of the placement trough 34. A plurality of protruding anti-slip blocks 35 are provided on a bottom surface of the placement trough 34. The plurality of anti-slip blocks 35 are circumferentially arranged along an inner wall of the placement trough 34. The rotating frame 26 is arranged below the drip tray 27 and sleeves an exterior of the drip tray tube 30. A thrust roller bearing is provided at a lower end of the drip tray 27. An upper end of the rotating frame 26 is located inside the thrust roller bearing, enabling a rotational connection between the rotating frame 26 and the drip tray 27. A sleeve tube 36 is provided on the rotating frame 26 surrounding the exterior of the drip tray tube 30. A driven gear 37 is provided on an exterior of the sleeve tube 36. The right-angle motor 29 is provided at a lower end of the base frame 25. A shaft of the right-angle motor 29 extends above the base frame 25. A drive gear 38 is provided on the shaft of the right-angle motor 29 extending above the base frame 25. The drive gear 38 meshes with the driven gear 37 to drive the rotating frame 26 to rotate. A semi-annular shield 39 is provided on an upper end of the rotating frame 26. A notch 40 is provided on one side of the semi-annular shield 39. A first photoelectric sensor 41 is provided on the drip tray 27. The first photoelectric sensor 41 cooperates with the notch 40.

Specifically, during mixing, the cup is placed within the placement trough 34 and rests above the anti-slip blocks 35. The mixing shaft and cutter head of the agitation device 4 then descend, extending into the cup to mix the materials. Simultaneously, the shroud and cover of the agitation device 4 enclose the exterior of the cup to prevent liquid splashing. Concurrently, the right-angle motor 29 engages the drive gear 38 with the driven gear 37, causing the rotating frame 26 to turn. The semi-annular shield 39 rotates 180 degrees, positioning itself between the item retrieval opening 9 and the shroud to provide a protective barrier. It also blocks the line of sight through the glass of the item retrieval opening 9. After mixing is completed, the right-angle motor 29 reverses, returning the semi-annular shield 39 to its original position. The first photoelectric sensor 41 prevents over-rotation during this return. This removes the obstruction between the item retrieval opening 9 and the shroud. The shroud and cover then retract upward, revealing the prepared smoothie beverage. Once the item retrieval opening 9 is opened, the prepared smoothie beverage can be retrieved from it. The shroud and cover then descend again. Subsequently, clean water is supplied from the water distributor into the drip tray tube 30. The water is ejected upward through the flush inlet 33 to clean the mixing cutter head, cover, and shroud. After the cleaning water is sprayed from the drip tray tube 30, the three-way solenoid valve closes the channel supplying clean water and opens the wastewater discharge channel. The used cleaning water drains through the perforated drainage plate 28 into the drip tray 27, then passes through the drip tray tube 30 and is discharged via pipeline into the waste collection bucket 89.

The cup and tube door mechanism comprises a first electric linear actuator 42, a door frame 43, door slide rails 44, a cup cover door 45, and anti-pinch photoelectric barriers 48. The door frame 43 is arranged on the inner wall of the front door 8 and is located outside the cover retrieval opening 12 and the item retrieval opening 9. Door slide rails 44 are provided on both inner side walls of the door frame 43. Connecting members 46 are provided on the outer sides of the door slide rails 44 and are connected to sliders of the door slide rails 44. The cup cover door 45 is arranged between the two connecting members 46 and is connected to the connecting members 46. The cup cover door 45 is located at a middle lower part of the connecting members 46. A glass frame 47 is provided between the two connecting members 46 and is connected to the connecting members 46. The glass frame 47 is located above the cup cover door 45. During use, glass must be installed onto the glass frame 47 to form a transparent door. The first electric linear actuator 42 is provided on the inner wall of the front door 8. An upper end of the first electric linear actuator 42 is connected to the cup cover door 45.

Anti-pinch photoelectric barriers 48 are provided on both outer side walls of the door frame 43.

Specifically, when the cover retrieval opening 12 and the item retrieval opening 9 need to be opened, the control system 3 controls the first electric linear actuator 42 to retract, thereby driving the cup cover door 45 and the glass frame 47 to move downward until the cover retrieval opening 12 and the item retrieval opening 9 are fully open. When the cover retrieval opening 12 and the item retrieval opening 9 need to be closed, the control system 3 controls the first electric linear actuator 42 to extend, using the cup cover door 45 and the glass frame 47 to block the cover retrieval opening 12 and the item retrieval opening 9 respectively, thus completing the closure.

The anti-pinch photoelectric barriers 48 can detect the presence of a hand within the item retrieval opening 9, effectively preventing the glass frame 47 from closing and pinching the purchaser during item retrieval, enhancing safety.

The transfer mechanism comprises a gripper-equipped mechanical arm 49 and an XZ dual-axis linear module 50. The gripper-equipped mechanical arm 49 is arranged inside the housing 1 and is located laterally below the cup dispenser 5. The XZ dual-axis linear module 50 is arranged inside the housing 1 and is located between the refrigeration system 2 and the waste collection mechanism. A mounting bracket 51 is provided on a slider of the XZ dual-axis linear module 50. A scale mounting base 52 is provided on an end of the mounting bracket 51 away from the XZ dual-axis linear module 50. An electronic scale 53 is provided inside the scale mounting base 52. A waterproof cover 54 is provided on an upper end of the electronic scale 53. A second photoelectric sensor 55 is provided on one side of the scale mounting base 52.

Specifically, the control system 3 controls the gripper-equipped mechanical arm 49 to retrieve an empty cup from the cup dispenser 5 and transport it onto the waterproof cover 54 on the electronic scale 53 of the XZ dual-axis linear module 50. The XZ dual-axis linear module 50 then moves the empty cup beneath the corresponding discharge guide hopper 74 to receive ingredients. Simultaneously, the electronic scale 53 weighs the cup and provides feedback to the control system 3. Once the total weight of the cup reaches the specified value, the gripper-equipped mechanical arm 49 removes the cup now containing fruits and/or vegetables and transports it under the material feeding mechanism to add the corresponding toppings. It is subsequently delivered to the water flushing mechanism. After the cup is properly positioned on the water flushing mechanism, the control system 3 controls the agitation device to process the materials within the cup into a smoothie beverage, achieving fully automated processing.

The fruit particle storage mechanism comprises a freezing cabinet 56, a lower fixed frame 57, an upper fixed frame 58, a fruit barrel mechanism, a slide rail mounting bracket 59, and a second electric linear actuator 97. Slide rail mounting brackets 59 are symmetrically arranged above the refrigeration system 2 inside the housing 1. A track plate 60 is provided on the inner side wall of each slide rail mounting bracket 59. Two slide grooves 61 are provided on the inner side wall of each track plate 60. An upwardly inclined arc-shaped groove 62 extends from the front end of each slide groove 61. A wheel bracket 63 is provided on the inner side of the two track plates 60. A first roller 64 is provided on the wheel bracket 63 at each position corresponding to the two slide grooves 61 of the track plate 60. The two first rollers 64 on the wheel bracket 63 are arranged one in front and one behind. Two balance wheels 65 are provided on a side of the wheel bracket 63 close to the track plate 60. The balance wheels 65 roll against the side surface of the corresponding track plate 60. A gasket strip retainer 66 is provided between the two wheel brackets 63 and is connected to the wheel brackets 63. A base shell 67 is installed on the gasket strip retainer 66. A dregs collection box 68 is provided inside the base shell 67 and is connected to the gasket strip retainer 66. A gasket strip is installed on an upper end of the gasket strip retainer 66. This allows the gasket strip retainer 66 to press tightly against the bottom of the freezing cabinet 56, thereby forming a seal for the bottom opening of the mounting cylinder 84. This ensures the cleanliness and hygiene of the mounting cylinder 84 and the discharge guide hopper 74, and allows for the collection of fruit particles occasionally falling from the mounting cylinder 84 and the discharge guide hopper 74. An actuator mounting piece 69 is provided at the rear ends of the two track plates 60 and is connected to the track plates 60. A second electric linear actuator 97 is provided in the middle of the actuator mounting piece 69. A front end of the second electric linear actuator 97 is connected to the base shell 67.

The freezing cabinet 56 is arranged on the slide rail mounting brackets 59. An inner shell 70 is provided inside the freezing cabinet 56. A lower fixed frame 57 is provided at the bottom of the inner shell 70. An upper fixed frame 58 is provided on an upper end of the lower fixed frame 57. A plurality of fruit barrel mechanisms are uniformly arranged inside the upper fixed frame 58.

An evaporator 71 is provided at the top inside the inner shell 70. The evaporator 71 is located behind the fruit barrel mechanisms.

Specifically, when it is necessary to receive fruit particles from the fruit barrel mechanism, the second electric linear actuator 97 retracts. This drives the base shell 67, gasket strip retainer 66, and the entire slide rail mounting bracket 59 assembly to move rearward along the slide grooves 61 and arc-shaped grooves 62. Due to the design of the arc-shaped grooves 62, during rearward movement, the entire assembly of the base shell 67, gasket strip retainer 66, and slide rail mounting bracket 59 descends a certain distance. This causes the gasket strip on the gasket strip retainer 66 to disengage from the bottom of the freezing cabinet 56, eliminating friction against the cabinet's bottom during movement. This exposes the lower opening of the mounting cylinder 84. The XZ dual-axis linear module 50 then moves the empty cup under the corresponding discharge guide hopper 74 and mounting cylinder 84 to receive the fruit particles.

After the receiving operation is completed, the second electric linear actuator 97 pushes the entire assembly of the base shell 67, gasket strip retainer 66, and slide rail mounting bracket 59 forward along the slide grooves 61 and arc-shaped grooves 62. When the first rollers 64 reach the arc-shaped groove 62 section, the entire assembly of the base shell 67, gasket strip retainer 66, and slide rail mounting bracket 59 ascends a certain distance. Consequently, the gasket strip retainer 66 presses tightly against the bottom of the freezing cabinet 56, forming a seal for the bottom opening of the mounting cylinder 84.

The evaporator 71 and the refrigeration system 2 work together to lower the temperature of the freezing cabinet 56.

The fruit barrel mechanism comprises a fruit container 72, a permanent magnet synchronous motor 73, a discharge guide hopper 74, a second conveying screw shaft 75, and a cutter head 76. The fruit container 72 is arranged on the upper fixed frame 58. A rear mounting piece 77 is provided at the bottom of the rear end of the fruit container 72. A bearing housing 78 with a spherical bearing is provided on the rear mounting piece 77. The second conveying screw shaft 75 is arranged at the bottom inside the fruit container 72. A rear end of the second conveying screw shaft 75 is arranged within the bearing housing 78 with the spherical bearing and extends through it. A motor mount 79 is provided at the rear end of the fruit container 72 on the upper fixed frame 58. A plurality of permanent magnet synchronous motors 73 are uniformly arranged on the motor mount 79. The permanent magnet synchronous motors 73 correspond one-to-one with the fruit containers 72. Each permanent magnet synchronous motor 73 is connected to the corresponding second conveying screw shaft 75 via a coupling. A discharge hole 80 is provided at the front end of the fruit container 72. A support bracket 81 is provided within the discharge hole 80. A front end of the second conveying screw shaft 75 is rotatably connected to the support bracket 81. The front end of the second conveying screw shaft 75 extends out of the support bracket 81. A threaded hole is provided at the front end of the second conveying screw shaft 75. The cutter head 76 is mounted to the threaded hole via a bolt. A buffer chamber 82 is provided ahead of the discharge hole 80 inside the fruit container 72. A discharge outlet 83 is provided at a lower end of the buffer chamber 82. A mounting cylinder 84 is provided directly below the discharge outlet 83 at the front end of the inner shell 70. A lower end of the mounting cylinder 84 extends to the bottom of the freezing cabinet 56. The discharge guide hopper 74 is provided inside the mounting cylinder 84.

A variety of selected frozen fruits and vegetables can be placed within the fruit container 72; these pre-portioned ingredients ensure each smoothie cup receives a perfectly balanced mix without the need for artificial preservatives.

Fruits: Options include bananas, strawberries, blueberries, mangoes, pineapples, etc., each chosen for its natural sweetness and high nutritional value. For larger fruits with firm flesh, such as pineapple, they must first be cut into small pieces or particles before being placed into the fruit container 72.

Vegetables: These include leafy greens, carrots, and other high-nutrient-density vegetables, skillfully incorporated without compromising taste to add health benefits. For vegetables with a harder texture, such as carrots, they must first be cut into small pieces or particles before being placed into the fruit container 72.

When the corresponding fruit or vegetable particles need to be dispensed, the control system 3 activates the permanent magnet synchronous motor 73 located at the rear of the corresponding fruit container 72 to rotate. This drives the corresponding second conveying screw shaft 75 to rotate, thereby conveying the fruits/vegetables towards the discharge hole 80. As they reach the discharge hole 80, the rotating cutter head 76 breaks them down into small particles. These particles fall into the buffer chamber 82, then exit through the discharge outlet 83 at the lower end of the buffer chamber 82, drop into the discharge guide hopper 74, and finally fall into the cup below.

The waste collection mechanism comprises a large dregs collection tray 85, a small dregs collection tray 86, a guide chute 87, a receiving plate 88, and a waste collection bucket 89. The large dregs collection tray 85 is arranged below the discharge guide hopper 74. A guide chute 87 is provided on the front inner wall of the housing 1, located above the large dregs collection tray 85. A receiving plate 88 is provided on the front inner wall of the housing 1 between the large dregs collection tray 85 and the guide chute 87. The small dregs collection tray 86 is arranged inside the housing 1 below the material feeding mechanism. The waste collection bucket 89 is arranged below the small dregs collection tray 86. A drain pipe 90 is provided at the lower end of each of the large dregs collection tray 85 and the small dregs collection tray 86. The drain pipes 90 communicate with the waste collection bucket 89 via pipelines.

Specifically, the large dregs collection tray 85 collects fallen fruit/vegetable particles, which are then discharged into the waste collection bucket 89 via the drain pipe 90 and connecting pipeline. The small dregs collection tray 86 catches spilled ingredients from the material feeding mechanism, which are also discharged into the waste collection bucket 89 via a pipeline.

During the dispensing of fruit/vegetable particles, the guide chute 87 and the receiving plate 88 also serve a guiding function, directing the particles into the large dregs collection tray 85.

Furthermore, when adding fruit/vegetable particles to the fruit containers 72, containers holding the particles can first be placed onto the receiving plate 88 in an order and position corresponding to the fruit containers 72. This allows for quick replenishment of the fruit containers 72.

A plurality of weighing mechanisms 91 are provided below the large dregs collection tray 85 at the bottom inside the housing 1. Water buckets are placed on these weighing mechanisms 91. A self-priming pump 99 and connected water pipe solenoid valve and water distributor are installed inside the housing 1. The water buckets are connected to the water pipe solenoid valve via a pipeline. The water distributor then connects another pipeline to a different internally threaded tube 23 for adding water to the cup. The self-priming pump 99 supplies water to the required locations.

The weighing mechanisms 91 perform real-time weighing of the water buckets and provide feedback to the control system 3, facilitating awareness of the water level within the buckets.

Locking casters 92 are provided at the four corner positions of the bottom of the housing 1, facilitating mobility of the equipment.

A viewing window 93 is provided on the front end of the housing 1. The front of the housing 1 also opens, facilitating the addition of materials and water changes within the equipment. The viewing window 93 is located in front of the fruit particle storage mechanism. The front part of the fruit containers 72 is also designed with a transparent window, allowing observation of the quantity of fruits/vegetables within the fruit containers 72 through the viewing window 93, enabling timely replenishment.

Maintenance doors 94 are symmetrically provided at the rear end of the housing 1, allowing them to be opened for internal equipment inspection and maintenance.

During specific implementation of the present invention, the workflow is as follows:

I. Order Placement and Cup Retrieval

The user selects fruit combinations and ingredients via the display screen 21 on the front door 8, chooses a payment method on the display screen 21, and completes the payment through the self-service checkout machine 7.

II. Control System Activates Transfer Mechanism

The control system 3 controls the gripper of the gripper-equipped mechanical arm 49 to move to the outlet at the lower part of the cup dispenser 5, grip an empty cup, and then place it onto the waterproof cover 54 of the XZ dual-axis linear module 50. The electronic scale 53 performs real-time weighing.

III. Quantitative Fruit Ingredient Dispensing

The XZ dual-axis linear module 50 moves the empty cup beneath the target discharge guide hopper 74.

The permanent magnet synchronous motor 73 at the rear of the corresponding fruit container 72 drives the second conveying screw shaft 75 to rotate, conveying fruits/vegetables towards the discharge hole 80. The cutter head 76 cuts the fruits, and the particles fall through the buffer chamber 82 into the cup. The electronic scale 53 monitors the weight, provides real-time feedback to the control system 3, and stops the dispensing once the set value is reached.

IV. Ingredient Addition and Mixing

The gripper-equipped mechanical arm 49 transfers the fruit cup to a position below the material feeding mechanism.

The first conveying screw shafts 19 inside the ingredient bins 14 and the milk container 16 are driven by the feed motors 98, dispensing one or several ingredients such as frozen cubes, yogurt, or acai berries into the cup. Milk is conveyed into the mixer 17, pre-mixed by the mixing motor 22, and then injected into the fruit cup through the discharge channel.

V. Smoothie Preparation and Retrieval

The fruit cup is delivered to the water flushing mechanism and placed into the placement trough 34. The rotating frame 26 is driven by the right-angle motor 29, which in turn rotates the semi-annular shield 39. The semi-annular shield 39 moves to block the item retrieval opening 9. The agitation device 4, regulated by the agitation controller 4-1, processes the mixture into a smoothie. After mixing is completed, the semi-annular shield 39 returns to its original position.

The first electric linear actuator 42 actuates the cup cover door 45 and the glass frame 47, simultaneously opening the item retrieval opening 9 and the cover retrieval opening 12. After the user retrieves the smoothie cup, they take the lid and straw provided by the cover and tube access mechanism 6 from the cover retrieval opening 12. The item retrieval opening 9 and the cover retrieval opening 12 are then closed.

In the description of embodiments of the present invention, it should be noted that if terms such as "center," "upper," "lower," "left," "right," "vertical," "horizontal," "inner," "outer," etc., indicate orientations or positional relationships, they are based on orientations or positional relationships shown in the drawings or conventional placement during use of the product. These terms are used solely for facilitating description of the present invention and simplifying the description, not to indicate or imply that the device or element must have a specific orientation or be constructed and operated in a specific orientation. Therefore, such terms shall not be construed as limiting the invention. Furthermore, terms "first," "second," "third," etc., are used only for distinguishing descriptions and shall not be construed as indicating relative importance.

Additionally, terms such as "horizontal," "vertical," "suspended," etc., do not require absolute horizontality or suspension but permit slight inclination. For example, "horizontal" merely indicates a direction relatively more horizontal than "vertical," not demanding complete horizontality; slight inclination is permissible.

In the description of embodiments of the present invention, "a plurality of" means at least two.

In the description of embodiments of the present invention, unless expressly specified or limited otherwise, terms "provided," "mounted," "connected," and "coupled" shall be broadly understood. For instance, connections may be fixed or detachable, or integrally formed; may be mechanical or electrical; may be direct connections or indirect connections via an intermediary; may be internal communication between two elements. Persons of ordinary skill in the art may understand specific meanings of the above terms in the present invention according to actual circumstances.

The above describes the present invention and its embodiments. This description is non-limiting, and the drawings illustrate only one implementation of the invention; actual structures are not limited thereto. In summary, if persons of ordinary skill in the art are inspired by this disclosure to design structural schemes and embodiments similar to the technical solution without creative effort and without departing from the inventive purpose of the present invention, they shall fall within the protection scope of the present invention.

What is claimed is:

1. A fruit and vegetable smoothie automatic vending machine, comprising a housing, a vending unit, and a beverage preparation mechanism; the vending unit is arranged inside the housing; the beverage preparation mechanism is arranged on one side of the vending unit inside the housing; the vending unit produces fruit cups and conveys them to the beverage preparation mechanism to be processed into fruit and vegetable smoothie beverages;

wherein further comprising a refrigeration system and a control system; the refrigeration system is arranged at a bottom inside the housing and supplies cold air for the equipment; the control system is arranged at a rear inside the housing and is used to control the entire equipment;

wherein the vending unit comprises a fruit particle storage mechanism, a transfer mechanism, and a waste collection mechanism; the fruit particle storage mechanism is arranged at an upper part inside the housing; the waste collection mechanism is arranged at a front part inside the housing; the waste collection mechanism is located below the fruit particle storage mechanism and is used to collect fruit particles falling from the fruit particle storage mechanism;

wherein the beverage preparation mechanism comprises an agitation device, a cup dispenser, a water flushing mechanism, a material feeding mechanism, a cover tube access mechanism, and a self-service checkout machine; a front door is provided at a front end of the housing; an item retrieval opening is provided in a middle portion of the front door; the agitation device is arranged inside the housing and is located behind the item retrieval opening; the water flushing mechanism is arranged directly below the agitation device; a slide rail frame is provided on one side of the agitation device inside the housing; drawer slide rails are provided on both inner side walls of the slide rail frame; the material feeding mechanism is arranged inside the slide rail frame, and both sides thereof are respectively connected to the corresponding drawer slide rails; the cup dispenser is arranged inside the slide rail frame, and both sides thereof are respectively connected to the corresponding drawer slide rails; the cup dispenser is located behind the material feeding mechanism; a cover retrieval opening is provided below the item retrieval opening at an upper end of the front door; a cup tube door mechanism is provided on an inner wall of the front door; the cup tube door mechanism cooperates with the cover retrieval opening and the item retrieval opening to simultaneously close and open the cover retrieval opening and the item retrieval opening; the cover tube access mechanism is provided at a rear end of the cup tube door mechanism inside the housing; the self-service checkout machine is provided on one side of the cover tube access mechanism inside the housing;

wherein an agitation controller is provided above the agitation device inside the housing;

wherein a display screen is provided in an upper middle portion of the front door.

2. The fruit and vegetable smoothie automatic vending machine of claim 1, wherein the material feeding mechanism comprises an ingredient bin frame, ingredient bins, a milk container frame, a milk container, and a mixer; one side of the milk container frame is connected to one side of the ingredient bin frame; the connected one side of the milk container frame and the connected one side of the ingredient bin frame are respectively connected to the drawer slide rails; the milk container is placed inside the milk container frame; a plurality of ingredient bins are placed inside the ingredient bin frame; a discharge tube is provided at a lower part of a front end of each of the milk container and the ingredient bins; a feed motor is provided at a rear end of each of the milk container and the ingredient bins; a first conveying screw shaft is provided at a bottom inside each of the milk container and the ingredient bins; a rear end of the first conveying screw shaft is connected to a shaft of the corresponding feed motor; a front end of the first conveying screw shaft is located inside the discharge tube; a spiral blade of the first conveying screw shaft is in tight contact with the discharge tube; a bevel gear meshing with the first conveying screw shaft is rotatably provided inside the milk container; the mixer is provided on the milk container frame below the discharge tube; a lower end of the discharge tube on the milk container extends into an interior of the mixer; a mixing motor is provided at a rear part of a lower end of the mixer; a rotating shaft of the mixing motor extends into the mixer; a discharge channel is provided at a front end of the mixer; a plurality of internally threaded tubes are provided on one side of the mixer on the milk container frame; a quick-connect coupling is provided at a front end of each internally threaded tube.

3. The fruit and vegetable smoothie automatic vending machine of claim 1, wherein the water flushing mechanism comprises a base frame, a rotating frame, a drip tray, a perforated drainage plate, and a right-angle motor; the base frame is fixed inside the housing; a drip tray tube is provided on the base frame; the drip tray is provided on an upper end of the drip tray tube; a tapered cylinder is provided inside the drip tray; a bottom of the tapered cylinder communicates with the drip tray tube; a screen plate is provided on an upper end of the tapered cylinder; a flush inlet is provided at a center of the screen plate directly above the drip tray tube; a placement trough is provided on the screen plate surrounding an outer periphery of the flush inlet; the perforated drainage plate is placed on the screen plate and sleeves an exterior of the placement trough; a plurality of protruding anti-slip blocks are provided on a bottom surface of the placement trough; the plurality of anti-slip blocks are circumferentially arranged along an inner wall of the placement trough; the rotating frame is arranged below the drip tray and sleeves an exterior of the drip tray tube; a thrust roller bearing is provided at a lower end of the drip tray; an upper end of the rotating frame is located inside the thrust roller bearing, enabling a rotational connection between the rotating frame and the drip tray; a sleeve tube is provided on the rotating frame surrounding the exterior of the drip tray tube; a driven gear is provided on an exterior of the sleeve tube; the right-angle motor is provided at a lower end of the base frame; a shaft of the right-angle motor extends above the base frame; a drive gear is provided on the shaft of the right-angle motor extending above the base frame; the drive gear meshes with the driven gear to drive the rotating frame to rotate; a semi-annular shield is provided on an upper end of the rotating frame; a notch is provided on one side of the semi-annular shield; a first photoelectric sensor is provided on the drip tray; the first photoelectric sensor cooperates with the notch.

4. The fruit and vegetable smoothie automatic vending machine of claim 1, wherein the cup tube door mechanism comprises a first electric linear actuator, a door frame, a door slide rail, a cup cover door, and an anti-pinch photoelectric barrier; the door frame is arranged on the inner wall of the front door and is located outside the cover retrieval opening and the item retrieval opening; door slide rails are provided on both inner side walls of the door frame; connecting members are provided on the outer sides of the door slide rails and are connected to sliders of the door slide rails; the cup cover door is arranged between the two connecting members and is connected to the connecting members; the cup cover door is located at a middle lower part of the connecting members; a glass frame is provided between the two connecting members and is connected to the connecting members; the glass frame is located above the cup cover door; the first electric linear actuator is provided on the inner wall of the front door; an upper end of the first electric linear actuator is connected to the cup cover door;

wherein the anti-pinch photoelectric barriers are provided on both outer side walls of the door frame.

5. The fruit and vegetable smoothie automatic vending machine of claim 1, wherein the transfer mechanism comprises a gripper-equipped mechanical arm and an XZ dual-axis linear module; the gripper-equipped mechanical arm is arranged inside the housing and is located laterally below the cup dispenser; the XZ dual-axis linear module is arranged inside the housing and is located between the refrigeration system and the waste collection mechanism; a mounting bracket is provided on a slider of the XZ dual-axis linear module; a scale mounting base is provided on an end of the mounting bracket away from the XZ dual-axis linear module; an electronic scale is provided inside the scale mounting base; a waterproof cover is provided on an upper end of the electronic scale; a second photoelectric sensor is provided on one side of the scale mounting base.

6. The fruit and vegetable smoothie automatic vending machine of claim 1, wherein the fruit particle storage mechanism comprises a freezing cabinet, a lower fixed frame, an upper fixed frame, a fruit barrel mechanism, a slide rail mounting bracket, and a second electric linear actuator; slide rail mounting brackets are symmetrically arranged above the refrigeration system inside the housing; a track plate is provided on the inner side wall of each slide rail mounting bracket; two slide grooves are provided on the inner side wall of each track plate; an upwardly inclined arc-shaped groove extends from the front end of each slide groove; a wheel bracket is provided on the inner side of the two track plates; a first roller is provided on the wheel bracket at each position corresponding to the two slide grooves of the track plate; the two first rollers on the wheel bracket are arranged one in front and one behind; two balance wheels are provided on a side of the wheel bracket close to the track plate; the balance wheels roll against the side surface of the corresponding track plate; a gasket strip retainer is provided between the two wheel brackets and is connected to the wheel brackets; a base shell is installed on the gasket strip retainer; a dregs collection box is provided inside the base shell and is connected to the gasket strip retainer; an actuator mounting piece is provided at the rear ends of the two track plates and is connected to the track plates; a second electric linear actuator is provided in the middle of the actuator mounting piece; a front end of the second electric linear actuator is connected to the base shell;

wherein the freezing cabinet is arranged on the slide rail mounting brackets; an inner shell is provided inside the freezing cabinet; a lower fixed frame is provided at the bottom of the inner shell; an upper fixed frame is provided on the upper end of the lower fixed frame; a plurality of fruit barrel mechanisms are uniformly arranged inside the upper fixed frame;

wherein an evaporator is provided at the top inside the inner shell; the evaporator is located behind the fruit barrel mechanisms.

7. The fruit and vegetable smoothie automatic vending machine of claim 6, wherein the fruit barrel mechanism comprises a fruit container, a permanent magnet synchronous motor, a discharge guide hopper, a second conveying screw shaft, and a cutter head; the fruit container is arranged on the upper fixed frame; a rear mounting piece is provided at a bottom of a rear end of the fruit container; a bearing housing with a spherical bearing is provided on the rear mounting piece; the second conveying screw shaft is arranged at a bottom inside the fruit container; a rear end of the second conveying screw shaft is arranged within the bearing housing with the spherical bearing and extends through the bearing housing with the spherical bearing; a motor mount is provided at a rear end of the fruit container on the upper fixed frame; a plurality of permanent magnet synchronous motors are uniformly arranged on the motor mount; the permanent magnet synchronous motors correspond one-to-one with the fruit containers; each permanent magnet synchronous motor is connected to the corresponding second conveying screw shaft via a coupling; a discharge hole is provided at a front end of the fruit container; a support bracket is provided within the discharge hole; a front end of the second conveying screw shaft is rotatably connected to the support bracket; the front end of the second conveying screw shaft extends out of the support bracket; a threaded hole is provided at the front end of the second conveying screw shaft; the cutter head is mounted to the threaded hole via a bolt; a buffer chamber is provided ahead of the discharge hole inside the fruit container; a discharge outlet is provided at a lower end of the buffer chamber; a mounting cylinder is provided directly below the discharge outlet at a front end of the inner shell; a lower end of the mounting cylinder extends to a bottom of the freezing cabinet; the discharge guide hopper is provided inside the mounting cylinder.

8. The fruit and vegetable smoothie automatic vending machine of claim 7, wherein the waste collection mechanism comprises a large dregs collection tray, a small dregs collection tray, a guide chute, a receiving plate, and a waste collection bucket; the large dregs collection tray is arranged below the discharge guide hopper; a guide chute is provided on the front inner wall of the housing; the guide chute is located above the large dregs collection tray; a receiving plate is provided on the front inner wall of the housing between the large dregs collection tray and the guide chute; the small dregs collection tray is arranged inside the housing below the material feeding mechanism; the waste collection bucket is arranged below the small dregs collection tray; a drain pipe is provided at a lower end of each of the large dregs collection tray and the small dregs collection tray; the drain pipe communicates with the waste collection bucket via a pipeline.

9. The fruit and vegetable smoothie automatic vending machine of claim 8, wherein a plurality of weighing mechanisms are provided below the large dregs collection tray at the bottom inside the housing; water buckets are placed on the weighing mechanisms.

10. The fruit and vegetable smoothie automatic vending machine of claim 1, wherein locking casters are provided at four corner positions of a bottom of the housing.

11. The fruit and vegetable smoothie automatic vending machine of claim 1, wherein a viewing window is provided at a front end of the housing; the viewing window is located in front of the fruit particle storage mechanism.

12. The fruit and vegetable smoothie automatic vending machine of claim 1, wherein maintenance doors are symmetrically provided at a rear end of the housing.

* * * * *